US010917610B2

(12) United States Patent
Aihara et al.

(10) Patent No.: US 10,917,610 B2
(45) Date of Patent: Feb. 9, 2021

(54) IMAGING APPARATUS, IMAGING SYSTEM, AND DISPLAY SYSTEM

(71) Applicant: Panasonic Intellectual Property Management Co., Ltd., Osaka (JP)

(72) Inventors: Masayuki Aihara, Osaka (JP); Shigenori Yatsuri, Osaka (JP); Yoshio Matsumura, Osaka (JP); Hiroyuki Shobayashi, Hyogo (JP); Katsumi Umeda, Kanagawa (JP); Shigeharu Kawamoto, Kanagawa (JP); Kazuki Miyama, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/413,733

(22) Filed: May 16, 2019

(65) Prior Publication Data
US 2019/0273889 A1 Sep. 5, 2019

Related U.S. Application Data

(63) Continuation of application No. PCT/JP2018/040176, filed on Oct. 29, 2018.

(30) Foreign Application Priority Data

Dec. 19, 2017 (JP) .................................. 2017-242761

(51) Int. Cl.
*H04N 5/00* (2011.01)
*H04N 7/015* (2006.01)
(Continued)

(52) U.S. Cl.
CPC .............. *H04N 7/0155* (2013.01); *B60R 1/00* (2013.01); *G02B 13/00* (2013.01); *G02B 13/18* (2013.01);
(Continued)

(58) Field of Classification Search
CPC ...... G02B 13/00; G02B 13/18; H04N 5/3696; H04N 5/2253; H04N 7/0155;
(Continued)

(56) References Cited

U.S. PATENT DOCUMENTS 5,355,309 A * 10/1994 Eberhard ............. G01N 23/046
250/208.1
6,259,359 B1 * 7/2001 Fujinami ................... B60R 1/00
340/435

(Continued)

FOREIGN PATENT DOCUMENTS

EP 3163259 A1 5/2017
JP 2000-295604 10/2000
(Continued)

OTHER PUBLICATIONS

Sano. "JP 2016-126254 A Translation". (Year: 2016).*
(Continued)

*Primary Examiner* — Zhihan Zhou
(74) *Attorney, Agent, or Firm* — Renner, Otto, Boisselle & Sklar, LLP

(57) ABSTRACT

An imaging apparatus is attached to a side of a moving body (for example, vehicle). The imaging apparatus includes an image sensor and an optical system that forms a subject image in a range of a predetermined vertical view angle and a predetermined horizontal view angle on an imaging surface. The optical system forms an image on the imaging surface so as to cause resolution in first region (R1) of the imaging surface to be higher than resolution in second region (R2) different from the first region. A position of center (G1) of first region (R1) is at least one of a position horizontally shifted from a center of the horizontal view angle and a position vertically shifted from a center of the vertical view angle.

9 Claims, 19 Drawing Sheets

(51) Int. Cl.
    *H04N 5/232*     (2006.01)
    *H04N 5/225*     (2006.01)
    *G02B 13/00*     (2006.01)
    *H04N 7/18*     (2006.01)
    *G02B 13/18*     (2006.01)
    *B60R 1/00*     (2006.01)

(52) U.S. Cl.
    CPC ......... *H04N 5/2253* (2013.01); *H04N 5/2254* (2013.01); *H04N 5/232127* (2018.08); *H04N 7/18* (2013.01)

(58) Field of Classification Search
    CPC .. H04N 5/232127; H04N 7/18; H04N 5/2254; B60R 1/00
    See application file for complete search history.

(56) References Cited

U.S. PATENT DOCUMENTS

| | | | | |
|---|---|---|---|---|
| 6,320,618 | B1* | 11/2001 | Aoyama | H04N 5/3696 348/335 |
| 6,734,911 | B1* | 5/2004 | Lyons | G01S 3/781 348/169 |
| 2006/0266835 | A1* | 11/2006 | Tanida | B60R 11/04 235/462.01 |
| 2007/0030377 | A1 | 2/2007 | Ishiguro | |

FOREIGN PATENT DOCUMENTS

| | | |
|---|---|---|
| JP | 2006-333120 | 12/2006 |
| JP | 2007-049266 | 2/2007 |
| JP | 2015-032936 | 2/2015 |
| JP | 2015-152780 | 8/2015 |

OTHER PUBLICATIONS

International Search Report of PCT application No. PCT/JP2018/040176 dated Jan. 15, 2019.

The Extended European Search Report dated Jan. 8, 2020 for the related European Patent Application No. 18889962.9.

Communication pursuant to Article 94(3) EPC dated Sep. 21, 2020 for the related European Patent Application vol. 18889962.9.

* cited by examiner

IMAGING APPARATUS, IMAGING SYSTEM, AND DISPLAY SYSTEM

TECHNICAL FIELD

The present disclosure relates to an imaging apparatus that is attached to a side of a moving body and that captures an image of a subject, an imaging system including the imaging apparatus, and a display system.

BACKGROUND ART

Unexamined Japanese Patent Publication No. 2015-32936 (PTL 1) discloses an imaging apparatus that is attached to a side of a vehicle and that captures an image of a rear of the vehicle. The imaging apparatus of PTL 1 includes optical systems that converge lights from a first subject positioned on a rear side of the vehicle and a second subject positioned on a side of the vehicle, respectively, imaging devices that output image data corresponding to images captured by the optical systems, and displays that are provided in a vehicle compartment and display the image data. A view angle of the optical system is more than or equal to 180 degrees. The imaging device has a plurality of pixels arranged in a rectangular shape on a focal plane of the optical system. One of a plurality of rectangular diagonal lines is disposed toward the rear side. This configuration enables to capture an image of a subject positioned at the rear side of a vehicle and an image of a subject positioned at the side of the vehicle without providing many cameras.

SUMMARY OF THE INVENTION

When an image of an oblique rear side of the vehicle is captured with an imaging apparatus attached to a side of the vehicle, it is desirable to capture the image at a wide angle in order to obtain as much information as possible. If a view angle is increased, however, the number of pixels per unit area in the image is reduced and the quality of an image of a subject is degraded accordingly. Consequently, in performing image analysis by using images captured at a wide angle, the number of pixels required for analysis becomes insufficient and thus the precision of the analysis is degraded. To solve such a problem, it is conceivable that one imaging apparatus includes an imaging apparatus capable of capturing images at a wide angle and an imaging apparatus capable of capturing images of a portion important for image analysis. However, such a configuration increases a size and a cost of an imaging apparatus.

The present disclosure provides an imaging apparatus that is attached to a side of a moving body and that can obtain a high resolution image of a region corresponding to a portion important for image analysis, while achieving a wide view angle without increasing a size of the apparatus.

In one aspect of the present disclosure, an imaging apparatus attached to a side of a moving body is provided. The imaging apparatus includes an imaging surface having a plurality of pixels arranged two-dimensionally, an image sensor that generates image data from a subject image formed on the imaging surface, and an optical system that forms the subject image included in a range of a predetermined vertical view angle and a predetermined horizontal view angle on the imaging surface. A number of pixels used for capturing the subject image included in a unit view angle is defined as resolution. The imaging surface includes a first region for capturing a first subject image of the subject image and a second region for capturing a second subject image of the subject image different from the first region. The optical system forms the subject image on the imaging surface so as to cause resolution of the first region to be higher than resolution of the second region. A position of a center of the first region is at least one of a position horizontally shifted from a center of the predetermined horizontal view angle and a position vertically shifted from a center of the predetermined vertical view angle.

According to the present disclosure, it is possible to provide an imaging apparatus that is attached to a side of a moving body and can obtain a high resolution image of a region corresponding to a portion important for image analysis, while achieving a wide view angle without increasing a size of the apparatus.

DESCRIPTION OF EMBODIMENTS

Exemplary embodiments will now be described below in detail with reference to the drawings as appropriate. However, descriptions in more detail than necessary may be omitted. For example, detailed descriptions of well-known matters and duplicate descriptions of substantially identical configurations may be omitted. This is to avoid unnecessarily redundancy in the following description, and to facilitate understanding by those skilled in the art.

The inventors of the present disclosure provide the accompanying drawings and the following description in order to allow those skilled in the art to fully understand the present disclosure, and do not intend to limit the subject matter described in the appended claims by the accompanying drawings and the following description.

First Exemplary Embodiment

[1-1. Overall Configuration]

Figure 1:
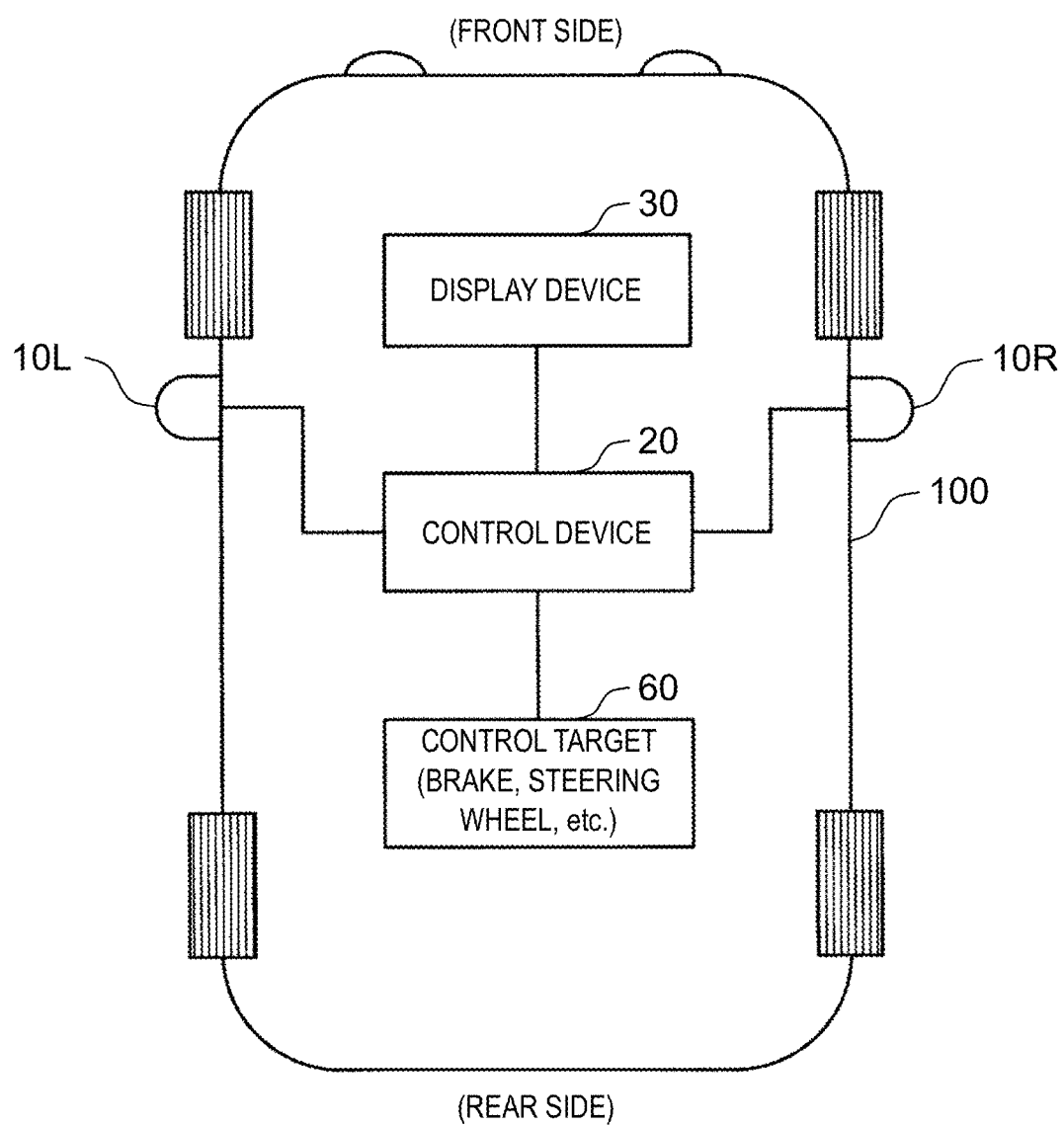
FIG. 1 is a diagram illustrating a configuration of an imaging system that is mounted on an automotive vehicle, according to a first exemplary embodiment of the present disclosure.

FIG. 1 is a diagram illustrating an example of applying an imaging apparatus according to the present disclosure to a side camera of an automobile (one example of a moving body). In the example of FIG. 1, right and left side cameras 10R, 10L are attached to respective sides of vehicle 100 of the automobile. Right side camera 10R and left side camera 10L capture images of subjects in regions of a side and an oblique rear side of the vehicle and generate image data, respectively. Right side camera 10R is attached directing backward on a right side of the vehicle so as to capture images of scenes on a right side and a right oblique rear side of the vehicle. Left side camera 10L is attached directing backward on a left side of the vehicle so as to capture images of scenes on a left side and a left oblique rear side of the vehicle. In the following description, in a case where right side camera 10R and left side camera 10L are collectively referred to, they are referred to as side camera 10.

Vehicle 100 includes control device 20 that processes image date from right and left side cameras 10R, 10L, display device 30 that displays images based on image data processed by control device 20, and control target 60 that is controlled by control device 20. Right and left side cameras 10R, 10L and control device 20 constitute an imaging system. Right and left side cameras 10R, 10L and display device 30 constitute a display system.

Display device 30 includes a display device such as a liquid crystal display panel or an organic electro luminescence (EL) display and a drive circuit for driving the display device. Display device 30 is an electronic room mirror, an in-vehicle display, or the like and is capable of displaying various information (at least any one of maps, route guides, radio station selections, various settings, and the like). In addition, display device 30 displays images of scenes of the side and the oblique rear side of the vehicle captured by respective side cameras 10R, 10L during traveling or stopping of vehicle 100. The place where display device 30 is disposed is not particularly limited, and for example, it may be disposed at a center of a dashboard. Alternatively, a number of display devices 30 is two or more and they may be disposed at both sides of a front windshield in the vehicle, respectively.

Control device 20 receives image data from each side camera 10R, 10L, performs image analysis, recognizes an object on the side or oblique rear side of vehicle 100, and controls control target 60 as necessary. The object is, for example, at least any one of an automobile, a bike, a bicycle, a human, and the like. For example, the control target is at least any one of a brake, an accelerator, a steering, and a warning device. Control device 20 also performs predetermined image processing on the image data from each side camera 10R, 10L to generate image data to be displayed on display device 30. Specific configurations of side camera 10 and control device 20 will be described below.

[1-1-1. Control Device]

Figure 2:
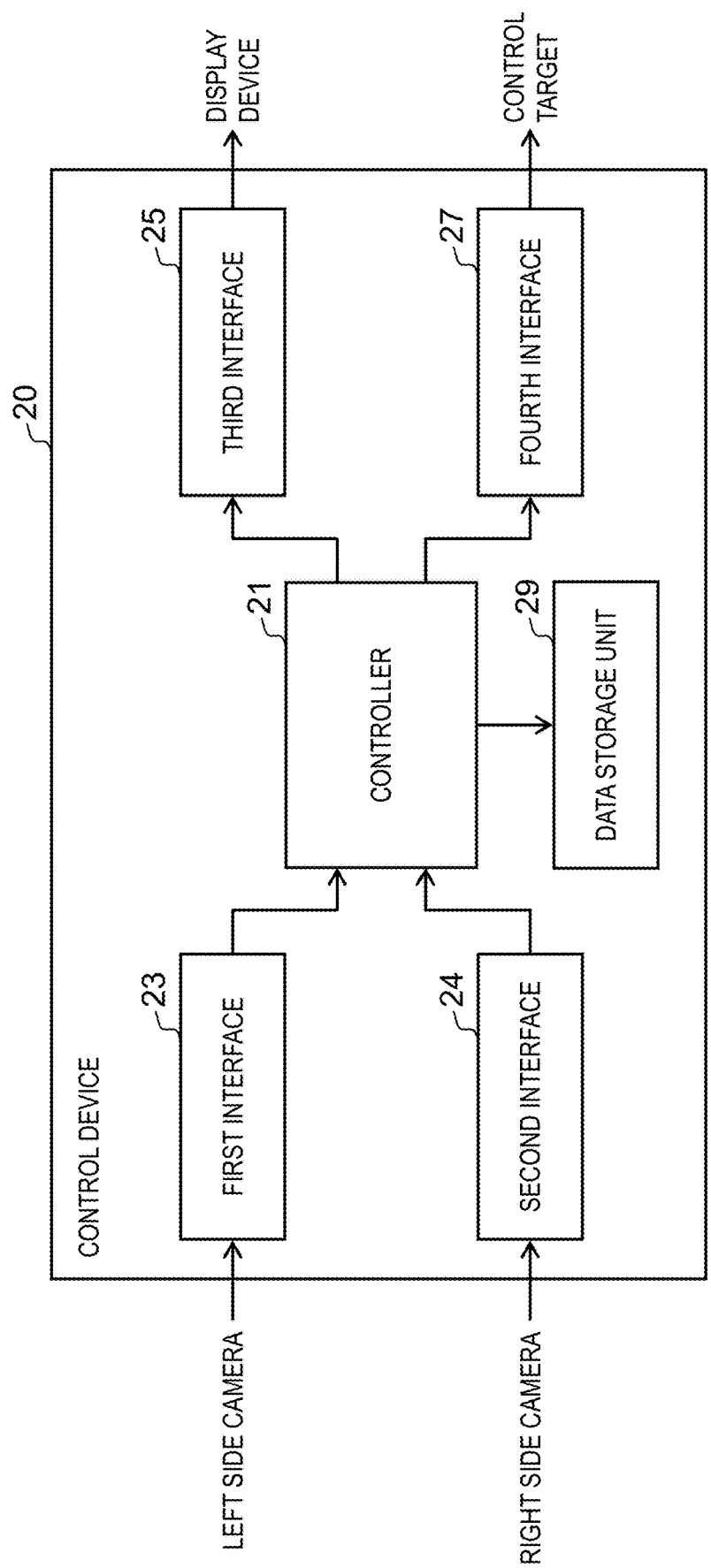
FIG. 2 is a diagram illustrating a configuration of a control device in the imaging system.

FIG. 2 is a block diagram showing a configuration of control device 20. Control device 20 includes first interface 23 (circuit) that inputs image data from left side camera 10L, second interface 24 (circuit) that inputs image data from right side camera 10R, controller 21 that performs image processing and image analysis on the input image data, and data storage unit 29 that stores data and the like. Control device 20 further includes third interface 25 (circuit) that transmits the generated image data to display device 30 and fourth interface 27 (circuit) that transmits a control signal for controlling control target 60 to control target 60.

Controller 21 includes a central processing unit (CPU) and a random access memory (RAM). As controller 21 executes programs stored in data storage unit 29, various functions are achieved. Controller 21 may include a dedicated hardware circuit designed so as to achieve desired functions. In other words, controller 21 may include the CPU, a micro processing unit (MPU), a field-programmable gate array (FPGA), a digital signal processor (DSP), an application specific integrated circuit (ASIC), or the like.

Data storage unit 29 is a recording medium such as a hard disk device, a solid state drive (SSD), or a semiconductor memory. Data storage unit 29 stores programs executed by controller 21, data, and the like.

[1-1-2. Side Camera]

Since left side camera 10L and right side camera 10R have basically the same configuration, in the following description, for convenience sake, the configuration and operation will be described mainly for left side camera 10L.

Figure 3:
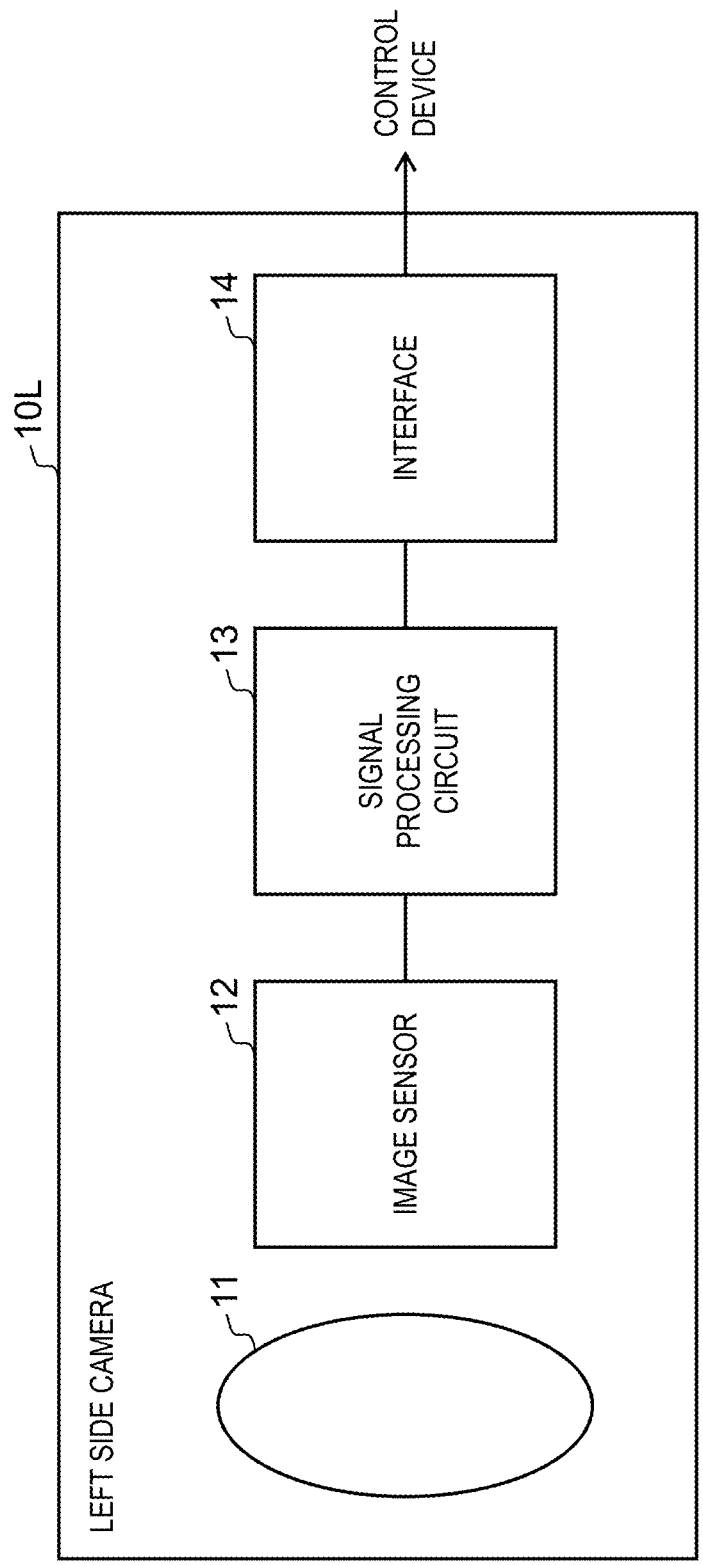
FIG. 3 is a diagram illustrating a configuration of a left side camera in the imaging system.

FIG. 3 is a block diagram illustrating a configuration of left side camera 10L. As shown in FIG. 3, left side camera 10L includes optical system 11, image sensor 12 that captures a subject image generated by receiving light through optical system 11 to generate an image signal, signal processing circuit 13 that performs predetermined image processing (gamma correction, distortion correction, and the like) on the image signal, and interface 14 (circuit) that outputs the image signal processed by signal processing circuit 13 to an external apparatus.

Optical system 11 is an optical element for forming an image on an imaging surface of image sensor 12. Optical system 11 includes a lens, a diaphragm, a filter, and the like. Optical system 11 will be described later in detail. Image sensor 12 is an imaging device that converts an optical signal into an electric signal and has a plurality of pixels two-dimensionally arranged thereon at equal intervals. Image sensor 12 is, for example, a charge coupled device (CCD) image sensor, a complementary metal oxide semiconductor (CMOS) image sensor, or an n-channel metal-oxide semiconductor (NMOS) image sensor.

Figure 4:
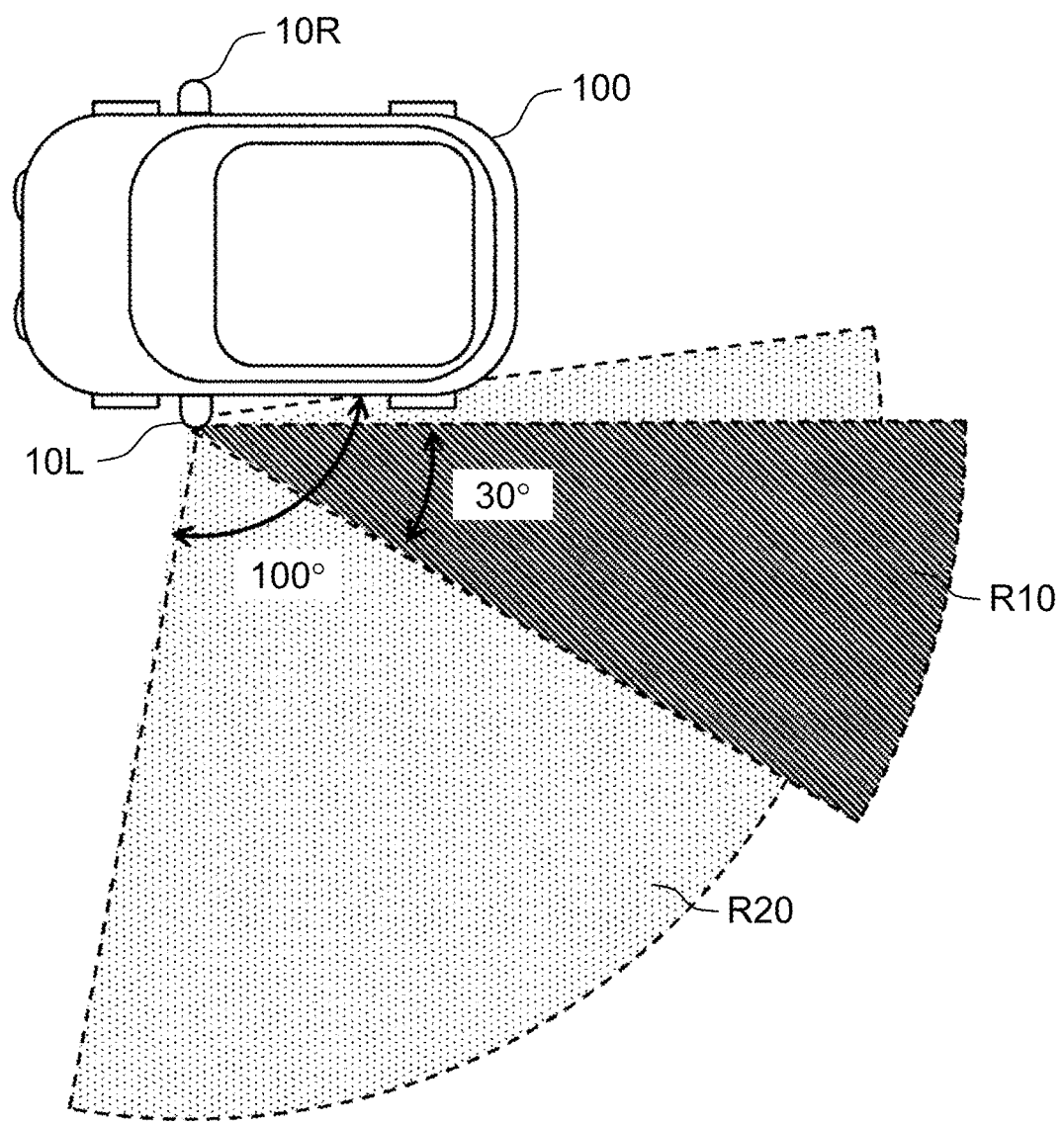
FIG. 4 is a diagram explaining a photographable range (view angle) of the left side camera in a horizontal direction.

FIG. 4 is a diagram for explaining a range of a view angle in a horizontal direction (horizontal view angle) that left side camera 10L can photograph. As shown in FIG. 4, left side camera 10L can capture an image of subject region R20 of a view angle of 100° in the horizontal direction. Particularly, in subject region R10 of a view angle of 30° inside subject region R20, an image can be captured with a larger magnification ratio. Left side camera 10L is attached to a side of vehicle 100 so as to capture an image of a part of a left side rear portion of the vehicle.

Figure 5:
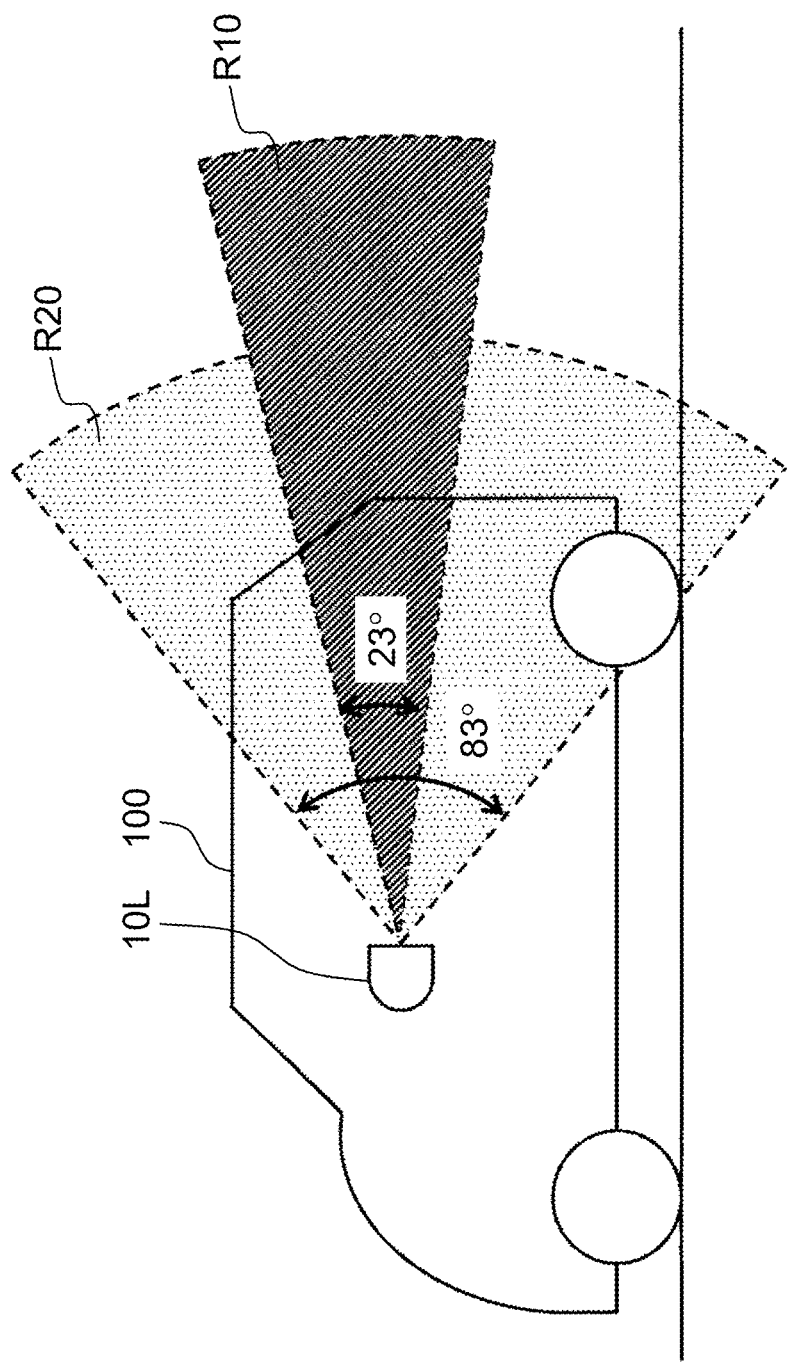
FIG. 5 is a diagram explaining a photographable range (view angle) of the left side camera in a vertical direction.

FIG. 5 is a diagram for explaining a range of a view angle in a vertical direction (vertical view angle) that left side camera 10L can photograph. As shown in FIG. 5, left side camera 10L can capture an image of a subject in subject region R20 of a view angle of 83° in the vertical direction. Particularly, in subject region R10 of a view angle of 23° inside region R20, an image can be captured with a larger magnification ratio. Note that, it is possible to capture an image of a desired region with a side camera by adjusting an optical axis direction or a view angle of the side camera.

Figure 6:
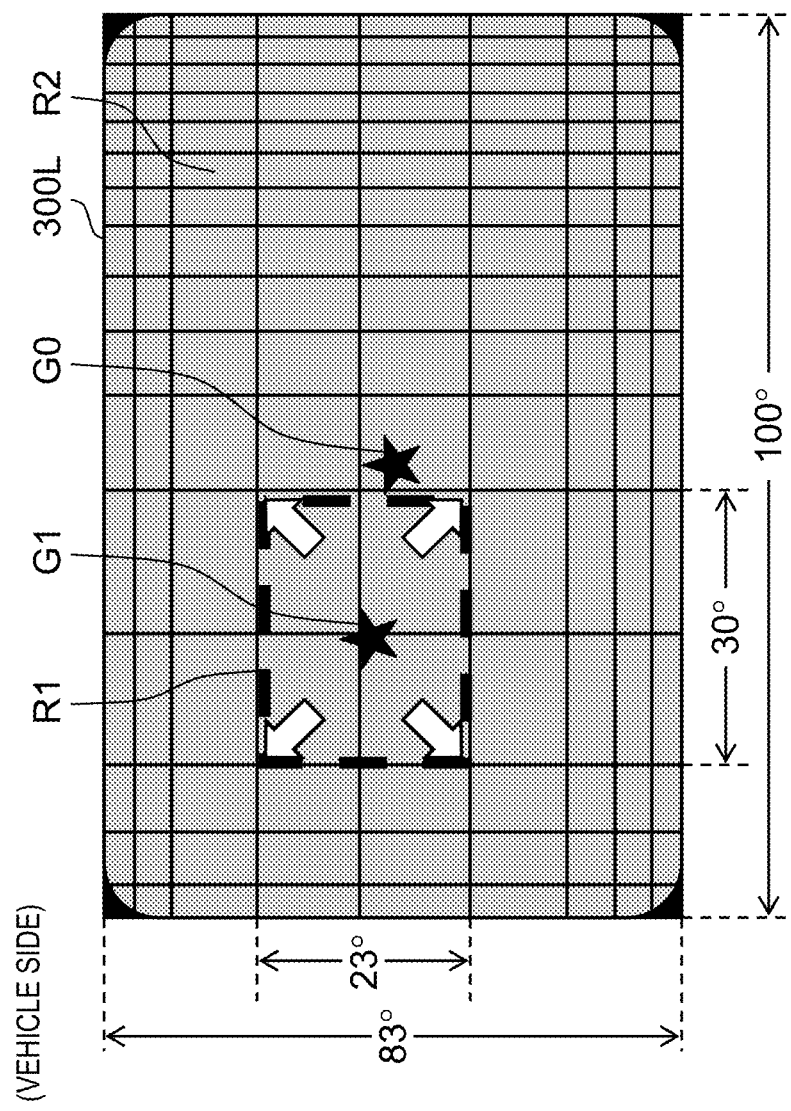
FIG. 6 is a diagram for explaining a magnification ratio of an image captured by the left side camera.

FIG. 6 is a diagram for explaining a magnification ratio of an image in a captured image captured through optical system 11 of left side camera 10L. In FIG. 6, the left side is a vehicle side. Region R1 (one example of a first region in the present disclosure) in captured image 300L is a region magnified with a relatively high magnification ratio and corresponds to subject region R10. Region R2 (one example of a second region in the present disclosure) is a region magnified with a relatively low magnification ratio and corresponds to a region in subject region R20 excluding subject region R10. Note that, optical system 11 is designed so that the magnification ratio changes not intermittently but successively and monotonically in regions R1 and R2. The configuration of optical system 11 that achieves such optical characteristics will be described below.

[1-1-2-1. Optical System]

Figure 7:
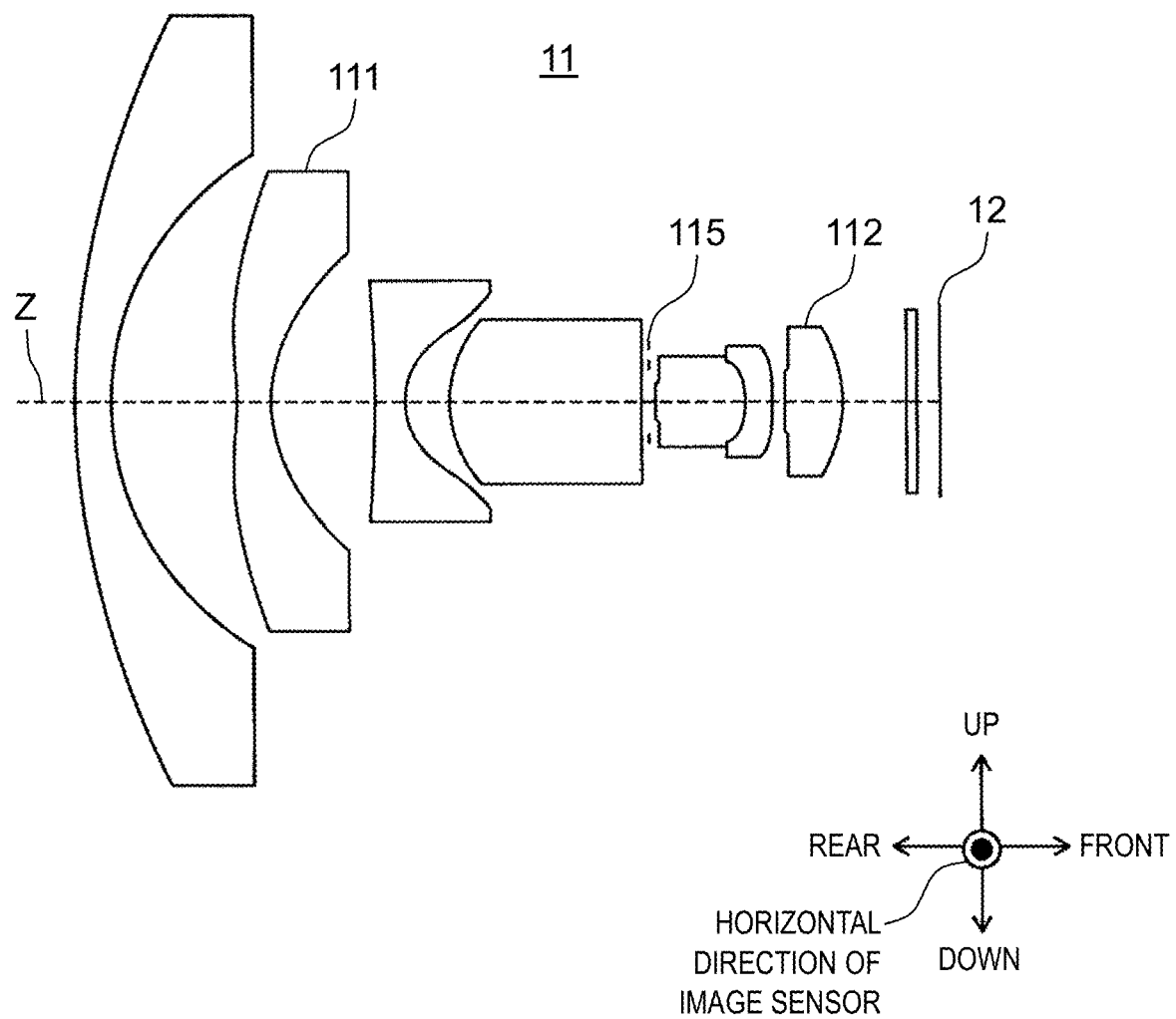
FIG. 7 is a diagram illustrating an exemplary configuration of an optical system of a side camera (cross sections of free-form lenses virtually taken in a vertical plane including an optical axis).

FIG. 7 is a diagram illustrating an example of a specific configuration of optical system 11 of left side camera 10L. FIG. 7 shows a cross-section when optical system 11 is virtually cut by a vertical plane including optical axis Z (a plane in which a horizontal direction of the image sensor is a normal). Here, optical axis Z is a virtual line that passes through a center of the imaging surface of image sensor 12 and orthogonally intersects the imaging surface. When optical system 11 includes at least one of a mirror, a prism, and the like that reflect light, its optical axis is bent by reflection. As shown in FIG. 7, optical system 11 includes a plurality of lenses and diaphragm 115. In particular, optical system 11 includes free-form lenses 111, 112.

The free-form lens is a lens in which a surface for refracting light to form an image has a non-arc shape and is not rotation symmetry. Note that a cylindrical lens is also one type of an arc-shaped lens, which is made different from the free-form lens. The free-form lens has a non-arc shape that is not a part of a perfect circle. Examples of a material of the free-form lens include, but not particularly limited to, glass and resin. Examples of a method of manufacturing the free-form lens include, but not particularly limited to, a method of molding the free-form lens by using a mold such as a metal mold.

A set of free-form lenses 111 and 112 constitutes a lens that can cause the magnification ratio of an image to be formed to vary depending on the view angle. Free-form lenses 111 and 112 are designed so that in captured image 300L, the magnification ratio of some region R1 is higher than that of other region R2 as shown in FIG. 6. Region R1 having a high magnification ratio is disposed so that its center G1 is positioned at a position shifted from center G0 of captured image 300L in both a horizontal direction and a vertical direction. More specifically, region R1 is disposed such that center G1 of region R1 is positioned at a position shifted to a vehicle side in the horizontal direction and shifted to an upside in the vertical direction with respect to center G0 of captured image 300L.

Figure 8:
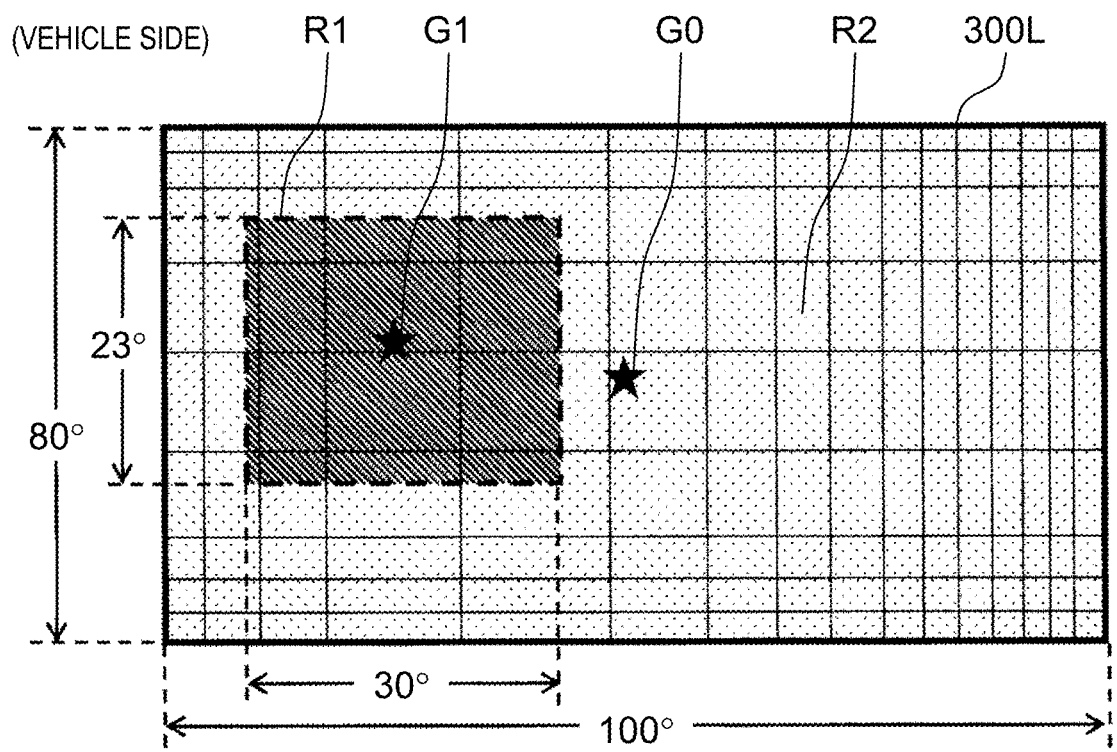
FIG. 8 is an explanatory diagram of a distribution example of resolution of an image formed by an optical system of the left side camera.

Image sensor 12 according to the present exemplary embodiment has a uniform pixel distribution in the horizontal and vertical directions. The resolution of an image formed on the imaging surface of image sensor 12 by optical system 11 of left side camera 10L is thus shown in FIG. 8. As shown in FIG. 8, in captured image 300L, the resolution of an image in region R1 is high (dense) whereas the resolution of an image in region R2 outside region R1 is low (sparse) as compared to region R1. In the present exemplary embodiment, region R1 is set to a region used for image analysis. The image of region R1 has high resolution, and thus it is possible to increase precision of analysis.

Here, the image resolution is defined as the number of pixels (the number of pixels per unit view angle) of image sensor 12 used for capturing an image with a unit view angle, the image being formed on image sensor 12 through optical system 11. The resolution is defined by the following formula.

$$\text{Resolution} = \text{number of pixels required to capture image with predetermined view angle/predetermined view angle} \quad (1)$$

Figure 9:
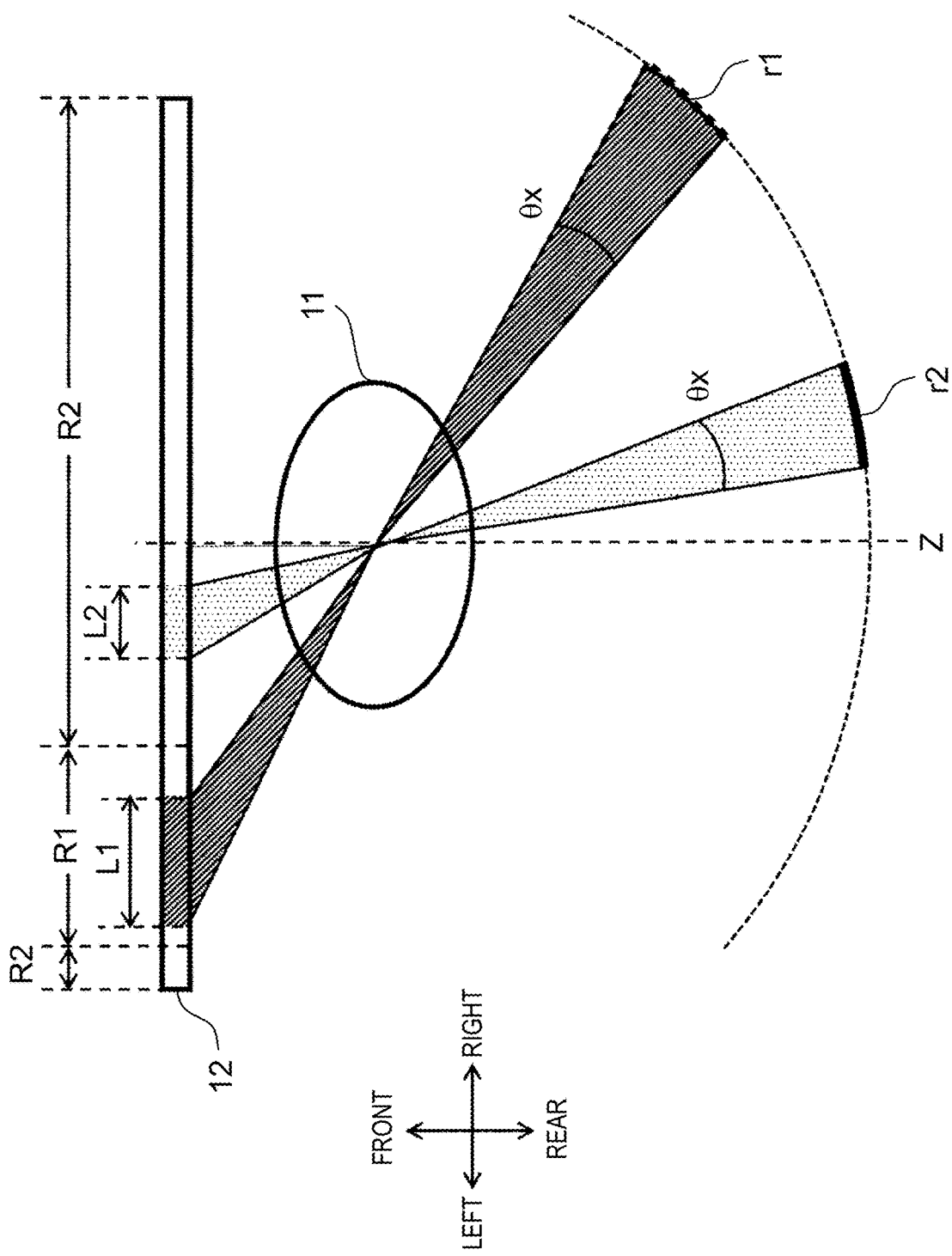
FIG. 9 is an explanatory diagram of the resolution of an image formed on an image sensor by the optical system of the left side camera.

The resolution of an image formed by optical system 11 is specifically described with reference to FIG. 9. FIG. 9 is a schematic explanatory diagram of an image forming state on image sensor 12 when optical system 11 and image sensor 12 are virtually cut by a horizontal plane including optical axis Z. As shown in FIG. 9, it is considered that a subject image in first region r1 in a range of view angle θx in a horizontal direction and a subject image in second region r2 having identical view angle θx are formed onto image sensor 12 through optical system 11. Region r1 is a part of subject region R10 and corresponds to a part of region R1 in a captured image. Region r2 is a part of subject region R20 and corresponds to a part of region R2 in a captured image.

Optical system 11 is designed such that magnification ratio M1 of region R1 is relatively high whereas magnification ratio M2 of region R2 is relatively low in captured image 300L. When image sensor 12 captures an image of a subject in first region r1 through optical system 11, the image in first region r1 is formed on the imaging surface of image sensor 12 while being magnified with magnification ratio M1, as shown in FIG. 9. When image sensor 12 captures an image of a subject in second region r2, the image is formed on the imaging surface of image sensor 12 while being magnified with magnification ratio M2 that is lower than magnification ratio M1. Therefore, length L2 of the image in second region r2 on the imaging surface is less than length L1 of the image in first region r1.

Pixels are two-dimensionally arranged on image sensor 12 at equal intervals. Consequently, as the horizontal length of an image increases, the number of pixels required to capture the image also increases. In other words, number N1 of pixels that are included in a range of length L1 and required to capture the image in first region r1 is larger than number N2 of pixels that are included in a range of length L2 (<L1) and required to capture the image in second region r2. The view angle of first region r1 and the view angle of second region r2 are equal (θx). Accordingly, the resolution of the image for first region r1 (=N1/θx) is higher than the resolution of the image for second region r2 (=N2/θx). The image for first region r1 is formed at a position corresponding to first region R1 on the imaging surface of image sensor 12. The image for second region r2 is formed at a position corresponding to second region R2 on the imaging surface of image sensor 12. Thus, the resolution of the image in first region R1 is higher than the resolution of the image in second region R2. The resolution in first region R1 mentioned here is defined as an average resolution in first region R1. The resolution in second region R2 is defined as an average resolution in second region R2.

Figure 10:
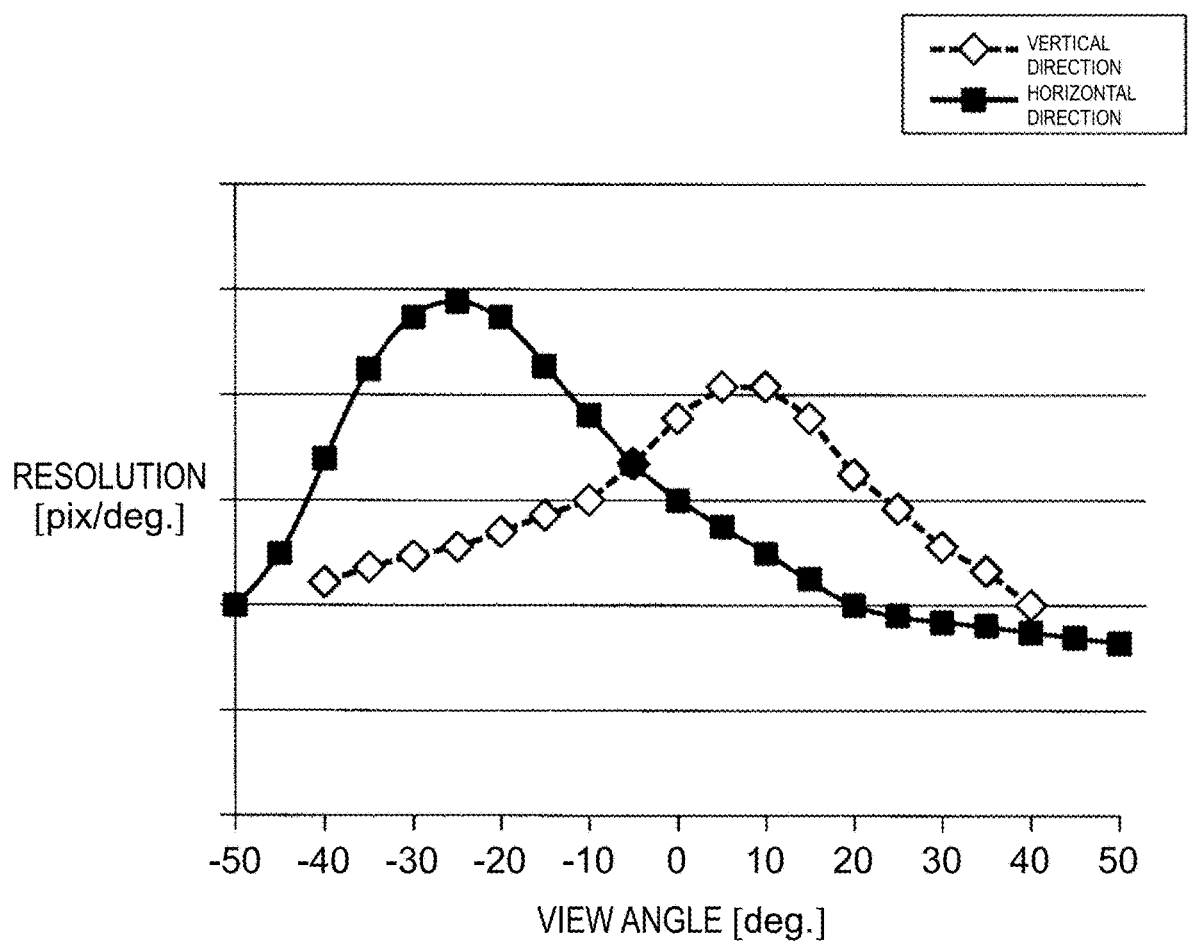
FIG. 10 is a diagram illustrating resolution (angle resolution) characteristics of a free-form lens used for the optical system of the left side camera.

FIG. 10 is a diagram illustrating resolution (angle resolution) characteristics with respect to vertical and horizontal view angles in optical system 11 of left side camera 10L. In FIG. 10, a center of each of the vertical and horizontal view angles is 0°. As shown in FIG. 10, a pixel density is high in a range of ±11.5° with +8° as a center in the vertical direction. In the horizontal direction, a pixel density is high in a range of ±15° with −25° as a center. In other words, with a view angle position of +8° in the vertical direction and −25° in the horizontal direction as a center, the resolution in a range of ±11.5° in the vertical direction and ±15° in the horizontal direction (region R10) is higher than the resolution in the other range (a region of region R20 excluding region R10).

Figure 11:
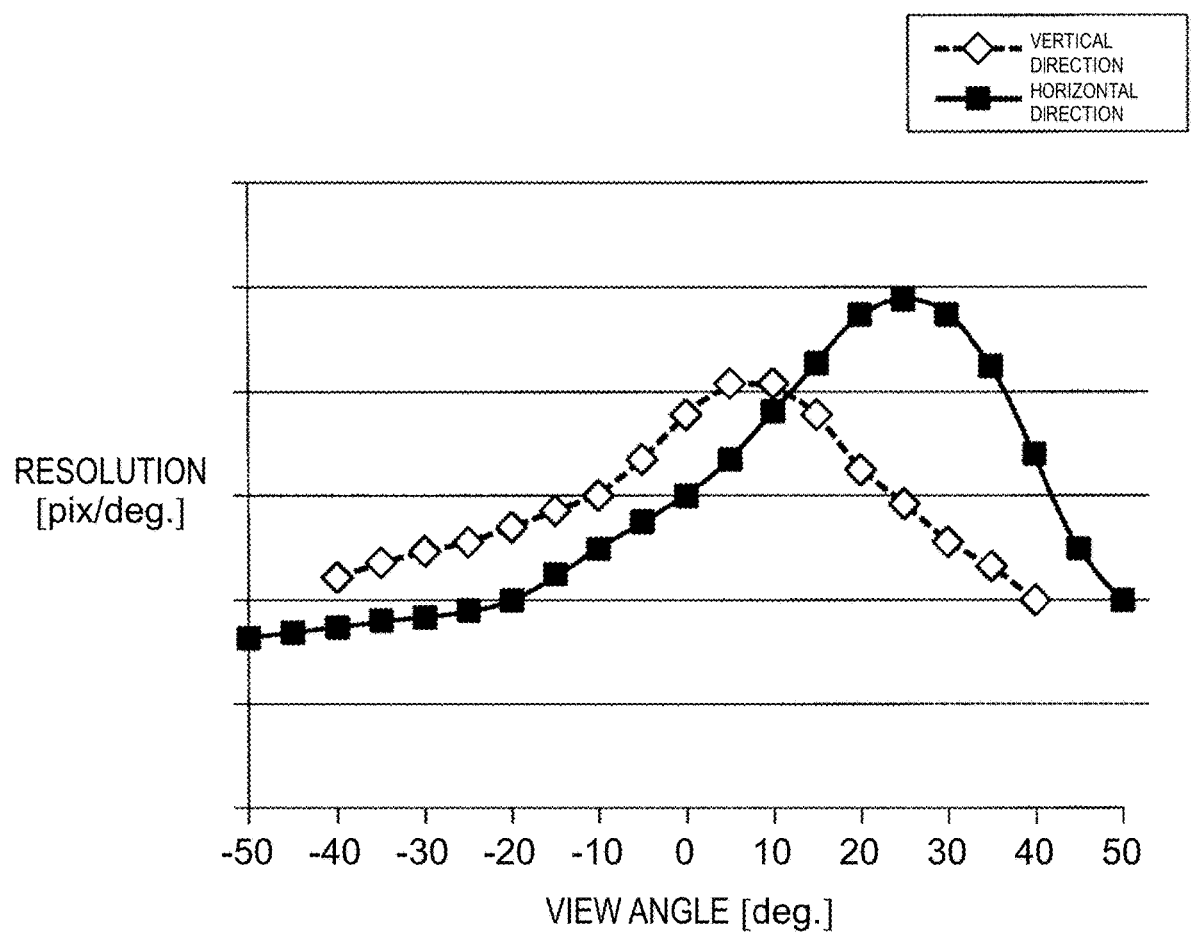
FIG. 11 is a diagram illustrating resolution (angle resolution) characteristics of a free-form lens used for an optical system of a right side camera.

FIG. 11 is a diagram illustrating resolution (angle resolution) characteristics with respect to vertical and horizontal view angles in the optical system of right side camera 10R. In FIG. 11, +50° side is a vehicle side. In the characteristics of FIG. 10 and FIG. 11, the characteristics in the vertical direction are the same, but the characteristics in the horizontal direction are horizontally reversed. As shown in FIG. 11, the resolution is high in a range of ±11.5° with +8° as a center in the vertical direction. The resolution is high in a range of ±15° with +25° as a center in the horizontal direction. In other words, with a view angle position of +8° in the vertical direction and +25° as a center in the horizontal direction, the resolution in a range of ±11.5° in the vertical direction and ±15° in the horizontal direction is higher than the resolution in the other range.

Free-form lenses 111 and 112 are designed so as to have the optical characteristics described above. Therefore, as shown in FIG. 8, in captured image 300L generated by image sensor 12, the resolution of the image formed in some region R1 can be made larger (that is, denser) than the resolution of the image formed in the other region R2.

Note that, an expression of different resolution in the present exemplary embodiment means a difference in resolution, which is generated by a combination of an optical system (for example, an optical system including an ordinary rotationally symmetric spherical lens and an aspherical lens) and a planer image sensor.

The effect of side camera 10 including optical system 11 as described above will be described. When a conventional side mirror is turned into an electronic mirror in an automotive vehicle, an image of wide angle W1 as shown in part (A) of FIG. 12 becomes necessary to detect the vicinity of the vehicle. Furthermore, when a lane is changed, an image of narrow view angle W2 as shown in part (B) of FIG. 12 becomes necessary to detect the situation of the rear side. This is because if the view angle is wide, a size of an object desired to be detected in the captured image is small, and the resolution of a distant object is insufficient to degrade a sensing accuracy. Therefore, in order to achieve two objectives, a camera for capturing an image of wide angle W1 and a camera for capturing an image of narrow view angle W2 need to be provided respectively, and there has been a problem that the number of cameras increases to increase a cost. In addition, since the number of cameras installed in vehicle 100 increases, there has been a problem that design quality of vehicle degrades and aerodynamic characteristics deteriorate.

Figure 12:
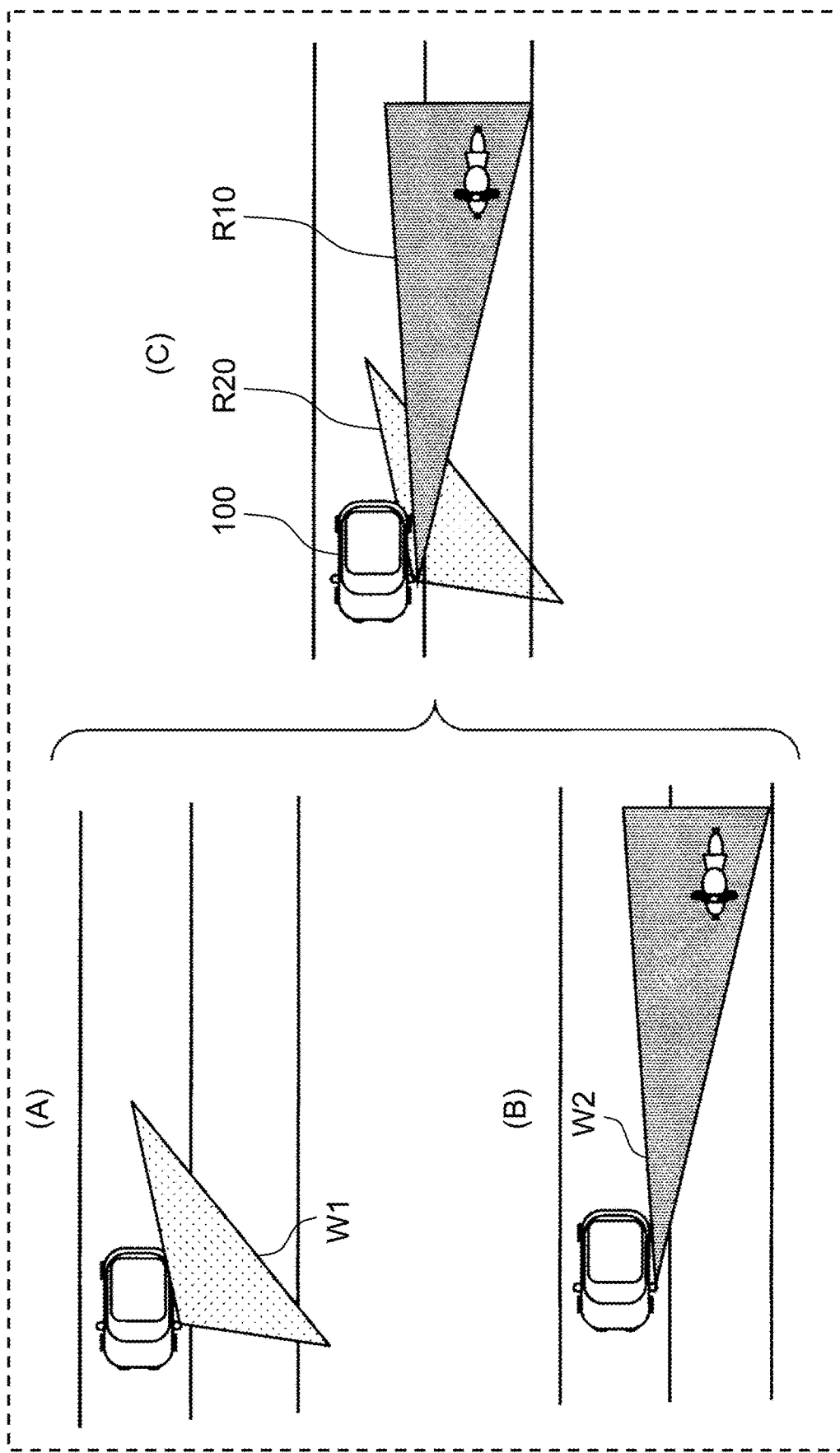
FIG. 12 is an explanatory diagram of problems to be solved by the present disclosure.

For such a problem, according to side camera 10 including optical system 11 as in the present exemplary embodiment, as shown in part (C) of FIG. 12, one camera can capture an image of region R20 in a wide view angle as a whole, and further can capture an image of some region R10 in a narrow view angle with a high magnification ratio (that is, high resolution). It is possible to improve precision of analysis, in other words, to detect up to a distant subject by performing image analysis on a portion having high resolution in the captured image. In addition, since a detection target is relatively in a vicinity for a wide angle portion, it is possible to detect the target with sufficient precision even with relatively suppressed magnification ratio (that is, relatively low resolution). That is, according to side camera 10 of the present exemplary embodiment, it is possible to capture an image having high resolution for some regions used for image analysis while securing a wide view angle as a whole.

Figure 13:
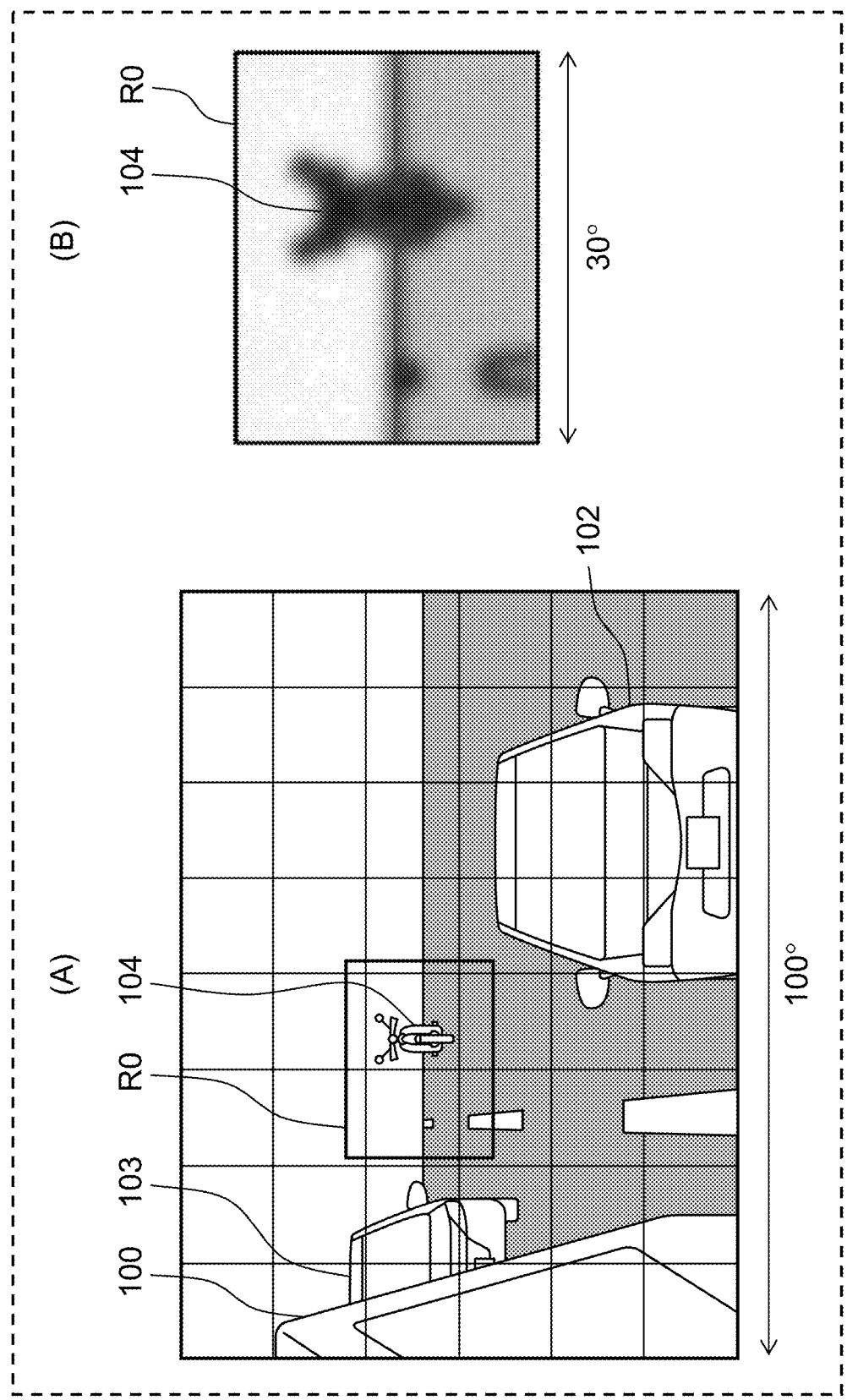
FIG. 13 is an explanatory diagram of an image captured by a left side camera using a conventional fisheye lens.

For example, part (A) of FIG. 13 is an image captured by a conventional wide angle camera. In this case, when a portion of region R0 is magnified for image analysis of rear detection, an image having low resolution can be obtained as shown in part (B) of FIG. 13. With such an image having low resolution, there is a case where an object cannot be recognized in image analysis, and bike 104 as a detection target running behind the vehicle cannot be recognized.

Figure 14:
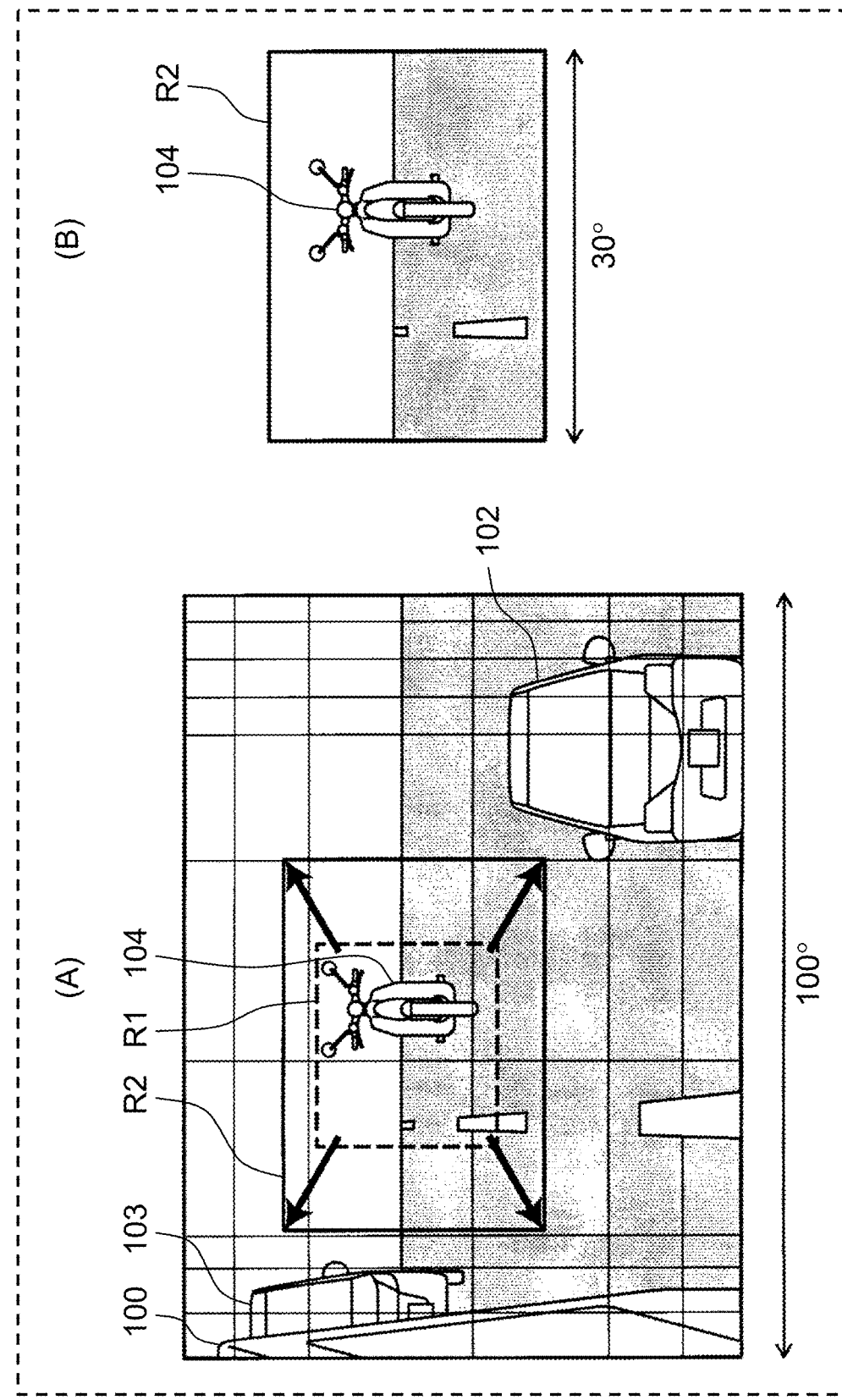
FIG. 14 is an explanatory diagram of an image captured by the left side camera of the present disclosure.

In contrast, according to side camera 10 of the present exemplary embodiment, as shown in part (A) of FIG. 14, it is possible to obtain an image in which a subject (here, bike 104) is magnified in region R1 used for image analysis. Thus, when this region R1 is cut out, an image having high resolution can be obtained as shown in part (B) of FIG. 14, and therefore bike 104 that is a detection target in image analysis can be precisely recognized. In other words, it is possible to perform detection up to a more distant place. Note that, to make the explanation easier to understand, a driver riding on bike 104 is omitted in FIGS. 12 to 14.

[1-2. Operation]

Operations of side camera 10 and control device 20 configured as described above will be described below.

Side camera 10 captures images of a side and a rear of vehicle 100 while the vehicle is traveling or stopping, generates image data, and transmits the image data to control device 20.

Control device 20 receives image data from side camera 10 through first interface 23 and second interface 24. Controller 21 of control device 20 performs predetermined image processing on the received image data, generates image data for display, and transmits the image data for display to display device 30 through third interface 25. Display device 30 displays an image based on the image data received from control device 20. The driver of vehicle 100 checks the image displayed on display device 30, thus perceiving the situation of the side and oblique rear side of the vehicle.

Figure 15:
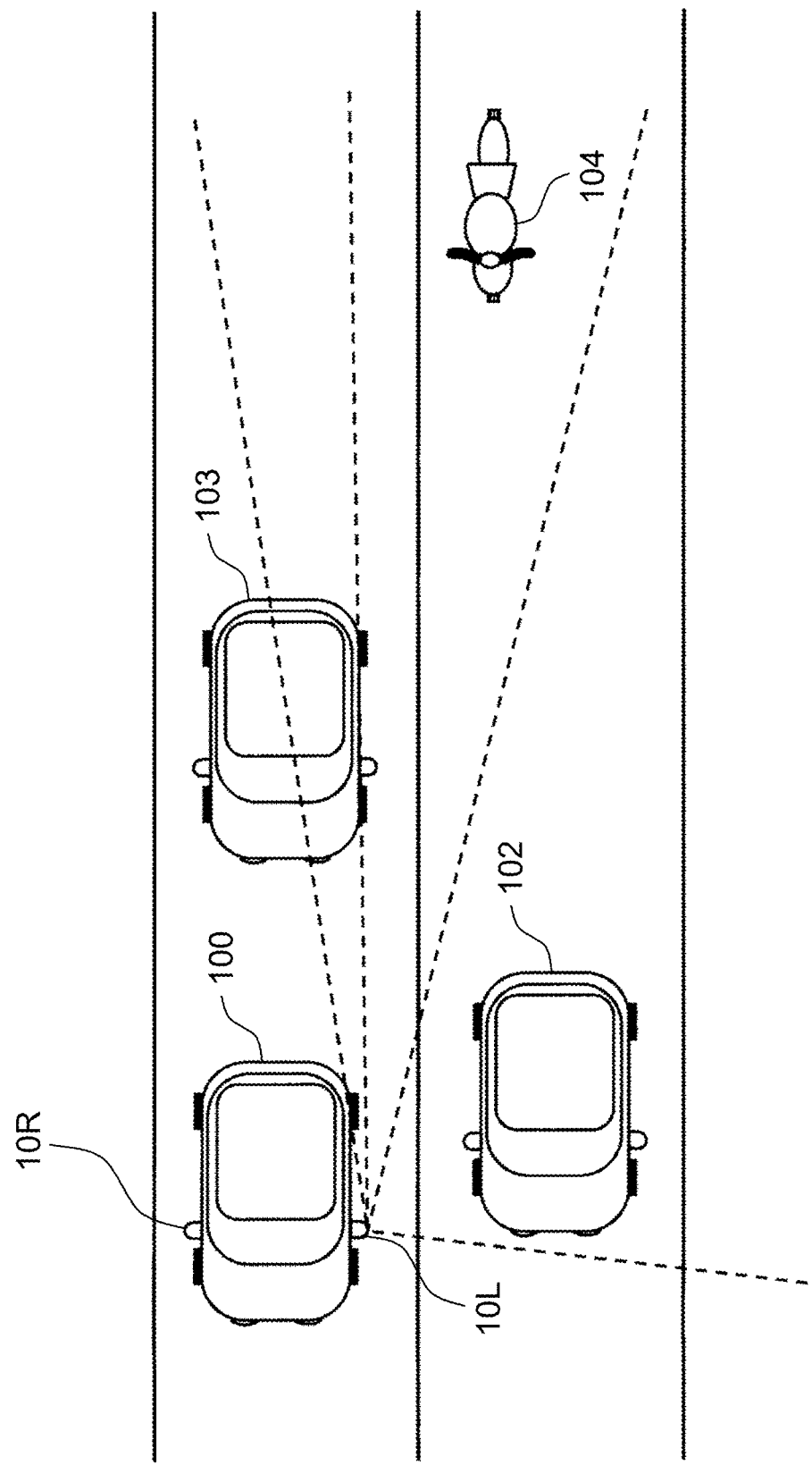
FIG. 15 is an explanatory diagram of effect obtained by the imaging system of the present disclosure.

Controller 21 of control device 20 further performs image analysis (sensing) on the image data received from side camera 10 to acquire various information about the situation of the oblique rear side of the vehicle. At this time, controller 21 analyzes an image of a portion of region R1 in the captured image. Since the portion of region R1 has high resolution, analysis can be performed precisely. For example, controller 21 can determine and detect, by the image analysis, whether an automobile or a bike during traveling exists at the rear side of a lane next to the lane on which vehicle 100 is traveling as shown in FIG. 15. In addition, controller 21 can determine and detect whether the automobile or bike is approaching to the own vehicle at how much speed. Then, controller 21 can achieve safe lane change by sending detected information to the driver or vehicle. Note that, to make the explanation easier to understand, a driver riding on bike 104 is omitted also in FIG. 15.

Controller 21 generates a control signal for predetermined control target 60 based on a result of image analysis and transmits the control signal to control target 60 through fourth interface 27. Control target 60 is thus controlled based on the situation of the side or rear side of the vehicle. For example, control target 60 is at least one of a brake, an accelerator, and a warning device.

For example, when the presence of vehicle 102 running in parallel with vehicle 100 on a lane next to the lane on which vehicle 100 is traveling as shown in FIG. 15 is detected by image analysis of the captured image of left side camera 10L of vehicle 100, or when bike 104 traveling at the rear side of the next lane is detected, controller 21 can control a steering operation to control behavior of vehicle 100 so that vehicle 100 does not move to the next lane.

According to side camera 10 of the present exemplary embodiment, one camera can capture an image having high resolution in some regions important for sensing while capturing a wide angle image. Therefore, reduction in size of the imaging apparatus can be achieved without the need of providing two cameras.

In this way, according to side camera 10 of the present exemplary embodiment, one apparatus can capture an image in a wide view angle range and also capture an image with high resolution in some regions important for sensing. Thus, reduction in the number of apparatuses can be achieved. Furthermore, reduction in size of the whole apparatus can be achieved. It is thus possible to increase the precision of image analysis using a captured image.

[1-3. Effects]

As described above, side camera 10 (one example of imaging apparatus of the present disclosure) of the present exemplary embodiment is an imaging apparatus attached to a side of vehicle 100 (one example of moving body of the present disclosure). Side camera 10 includes image sensor 12 and optical system 11. Image sensor 12 includes an imaging surface on which a plurality of pixels are two-dimensionally arranged. Image sensor 12 generates image data from a subject image formed on the imaging surface. Optical system 11 forms a subject image included in a range of a predetermined vertical view angle (for example, 83°) and a predetermined horizontal view angle (for example, 100°) on the imaging surface of image sensor 12.

Here, the number of pixels for capturing a subject image included in a unit view angle is defined as resolution. The imaging surface includes a first region (for example, region R1 of FIG. 6) for capturing a first subject image of the subject image and a second region (for example, region R2 of FIG. 6) for capturing a second subject image of the subject image different from the first region.

Optical system 11 forms an image on the imaging surface so as to cause resolution of an image in first region R1 of the imaging surface to be higher than resolution of an image in second region R2. First region R1 may be disposed at a position to which a position of center G1 of the region is horizontally shifted from a center of the horizontal view angle. For example, first region R1 may be disposed at a position shifted from center G0 of the horizontal view angle to a side near a region for forming an image of a part of vehicle 100.

With the above configuration, resolution of first region R1 can be made higher than resolution of another region R2 in the captured image (for example, an image obtained by imaging the side and oblique rear side of the vehicle). Thereby, one apparatus can capture an image in which an image of a region necessary for image analysis has higher resolution while securing a wide view angle as a whole, thus improving analysis precision of the captured image. That is, increase in size and cost of an apparatus can be suppressed. Furthermore, center G1 of first region R1 is disposed at a position horizontally shifted from the center of horizontal view angle, and thereby, for example, an image of a region in which an image of the vehicle on the next lane is captured can be captured with high resolution. Therefore, resolution of a region necessary for image analysis can be increased.

In addition, in the present exemplary embodiment, first region R1 may be disposed at a position horizontally shifted from the center of the horizontal view angle toward a region for forming an image of vehicle 100. This facilitates forming an image of the vehicle traveling on a lane next to the lane of vehicle 100 in first region R1. That is, it becomes possible to detect a vehicle traveling on the next lane more reliably.

Furthermore, in the present exemplary embodiment, a position of center G1 of first region R1 may be disposed at a position shifted from the center of a vertical view angle. For example, center G1 of first region R1 may be disposed at a position vertically shifted from the center of the vertical view angle so as to approach a region for forming an image of the oblique rear side of vehicle 100. This can increase more resolution of an image of a region necessary for image analysis and improve analysis precision of the captured image.

In addition, in the present exemplary embodiment, the number of peaks of resolution in each of the horizontal view angle and the predetermined vertical view angle may be one. Setting the number of peaks of resolution to one can increase more resolution of a region necessary for image analysis and improve analysis precision of the captured image.

Further, in the present exemplary embodiment, optical system 11 may include free-form lenses 111, 112. This enables to freely design a magnification ratio that varies depending on a view angle in the optical system.

In addition, in the present exemplary embodiment, side camera 10, when attached to the side of vehicle 100, may capture an image of the side and the oblique rear side of vehicle 100. This enables to capture, for example, an image of a region for which it is desired to confirm safety in change of lane.

Note that, a side mirror can be turned into an electronic mirror if image data generated by side camera 10 is projected to or displayed on a side of a front windshield of a vehicle. In this case, an image displayed on the electronic mirror may be an image obtained by correcting the image shown in part (A) of FIG. 14. That is, the image shown in part (A) of FIG. 14 is a distorted image because region R1 is displayed larger and region R2 is displayed smaller. Therefore, when an image is displayed on the electronic mirror, an image obtained by averaging the magnification ratios of the image shown in part (A) of FIG. 14 may be displayed.

Specifically, the number of pixels in region R1 may be reduced. In this case, an image of region R1 displayed on the electronic mirror is small. However, since a data amount of region R1 is larger than that of region R2, the image of region R1 may be small but is clear. The number of pixels in region R2 may be increased. In this case, an image of region R2 displayed on the electronic mirror is large. Since a data amount of region R2 is relatively small, data may be complemented.

On the other hand, when the image data generated by side camera 10 is exclusively used in image analysis for sensing, the image need not be corrected. That is, data of the distorted image as shown in part (A) of FIG. 14 may be directly used for the analysis.

Second Exemplary Embodiment

Optical system 11 is constituted by using a free-form lens in the first exemplary embodiment, for obtaining a captured image in which some region R1 has high resolution. However, optical system 11 does not necessarily use the free-form lens. Such a captured image can be also achieved by modifying a pixel distribution of image sensor 12 with a common, rotational symmetric optical system. The configuration of side camera 10 that includes an optical system not including the free-form lens will be described below.

Figure 16:
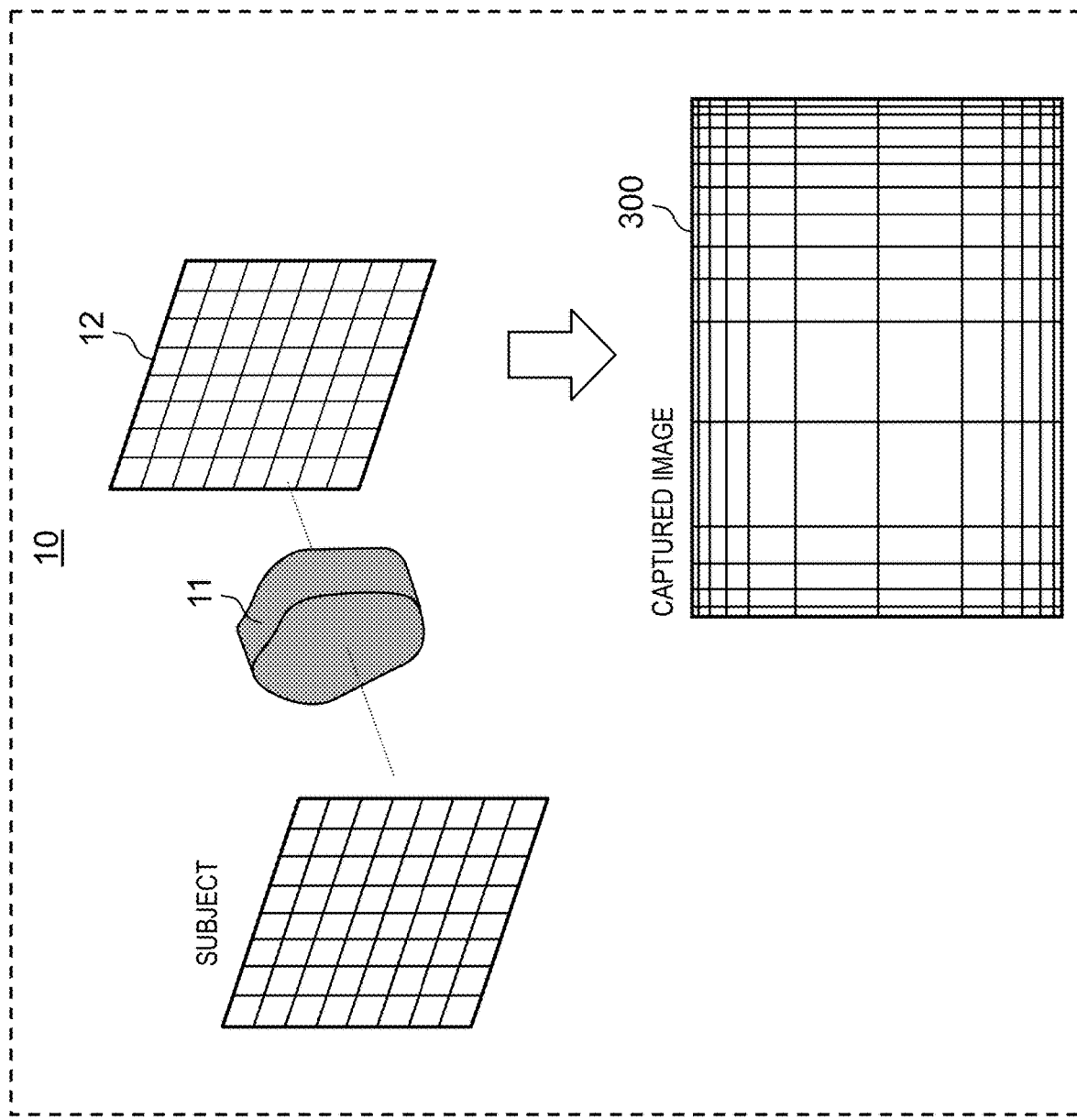
FIG. 16 is an explanatory diagram of the optical system and the image sensor in the left side camera according to the first exemplary embodiment and of a captured image formed by the optical system and the image sensor.
Figure 17:
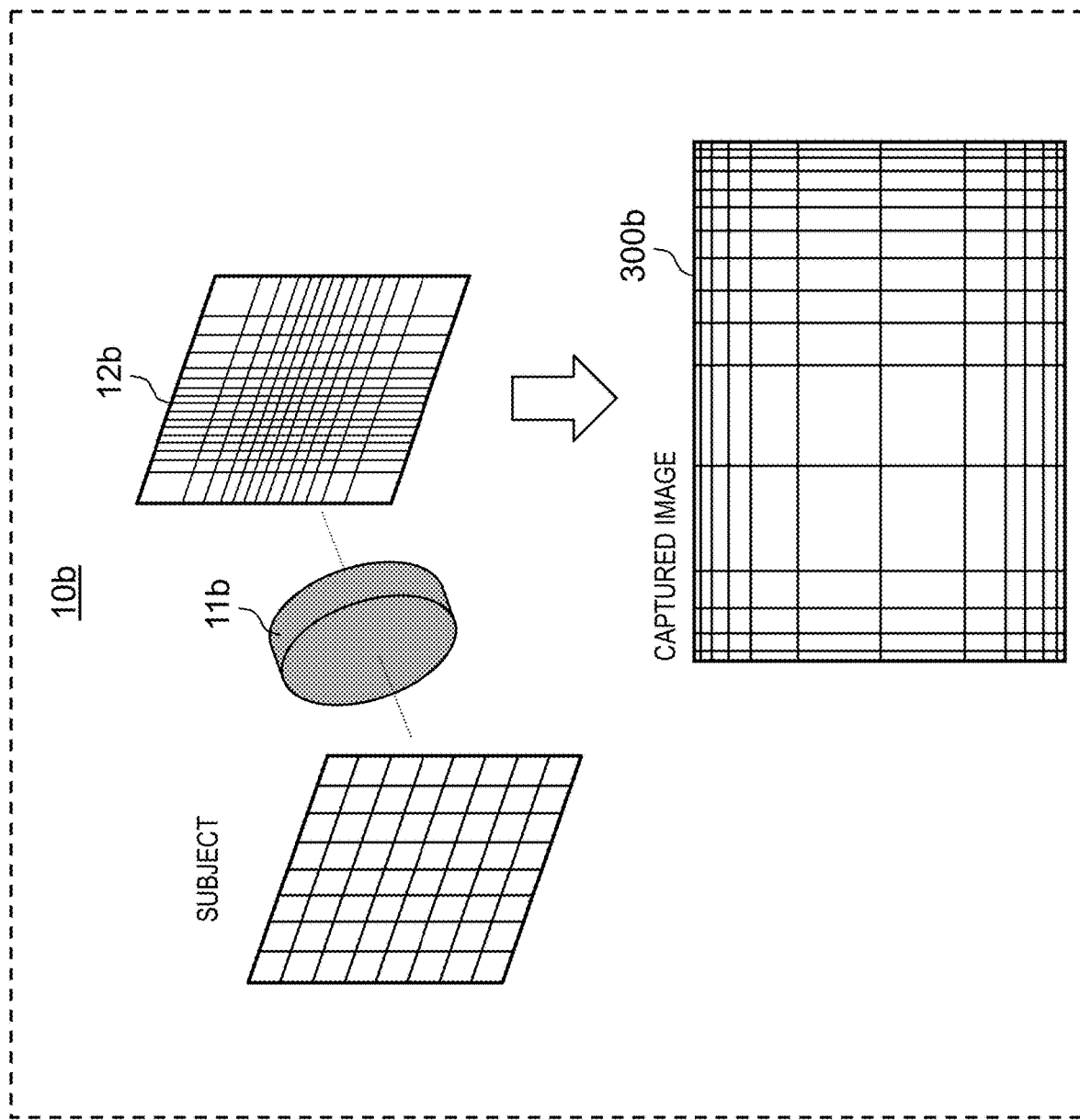
FIG. 17 is an explanatory diagram of an optical system and an image sensor in a left side camera according to a second exemplary embodiment and of a captured image formed by the optical system and the image sensor.

FIG. 16 is an explanatory diagram of a pixel distribution of image sensor 12 in side camera 10 according to the first exemplary embodiment and of a resolution distribution of a captured image captured by a combination of optical system 11 and image sensor 12. FIG. 17 is an explanatory diagram of a pixel distribution of image sensor 12b in side camera 10b according to the second exemplary embodiment and of a resolution distribution of captured image 300b captured by a combination of optical system 11b and image sensor 12b.

As shown in FIG. 16, a plurality of pixels are two-dimensionally arranged on image sensor 12 at equal intervals in the first exemplary embodiment. An image in which some region R1 has high resolution is formed on the imaging surface of image sensor 12 by free-form lenses 111, 112 of optical system 11. It is thus possible to obtain a captured image in which region R1 has high resolution and other regions have low resolution.

Figure 18:
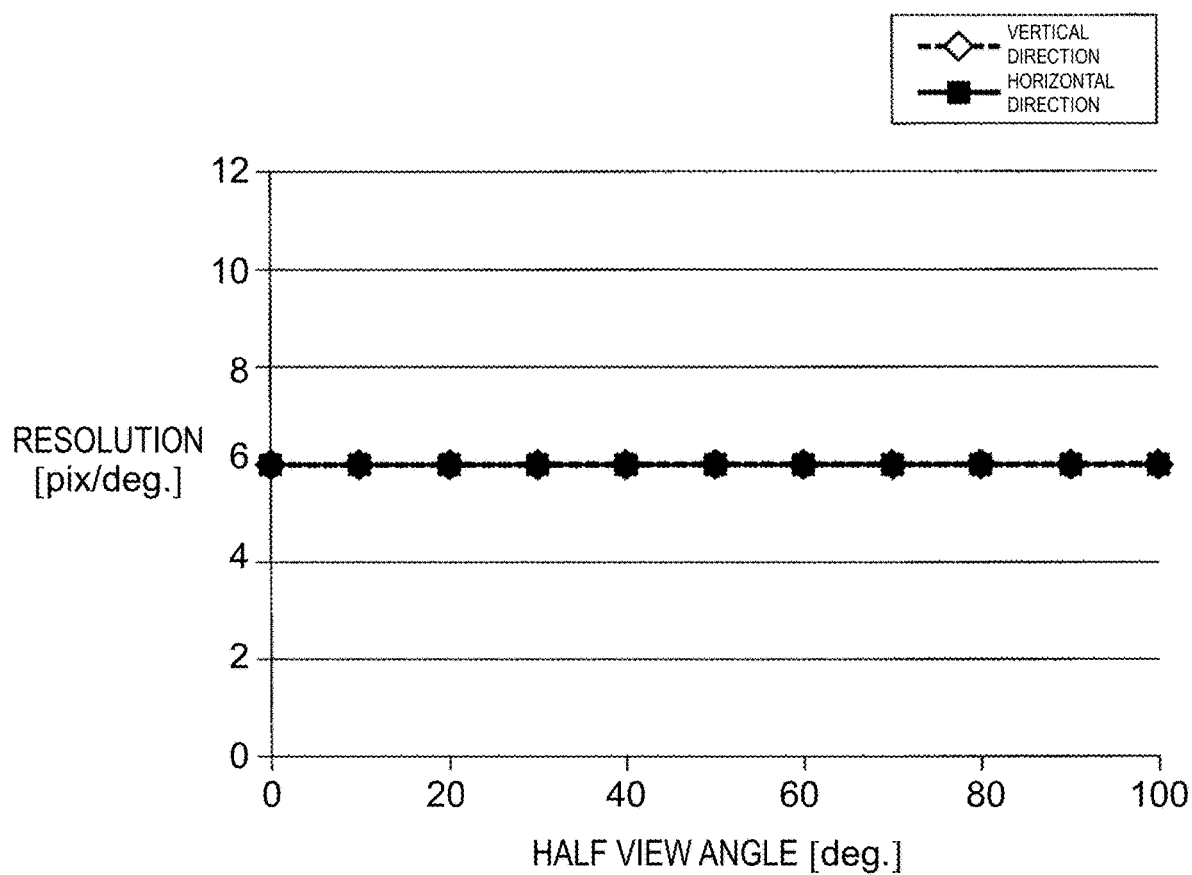
FIG. 18 is a diagram illustrating resolution (angle resolution) characteristics of the optical system in the side camera according to the second exemplary embodiment.

Meanwhile, in the present exemplary embodiment, side camera 10 includes optical system 11b that is a rotational symmetric lens and image sensor 12b with a specific pixel distribution, as shown in FIG. 17. Optical system 11b is a lens that has resolution (angle resolution) characteristics shown in FIG. 18 with respect to vertical and horizontal resolutions when an image is formed on an image sensor with a uniform pixel distribution. That is to say, optical system 11b has the same resolution characteristics with respect to vertical and horizontal view angles.

Figure 19:
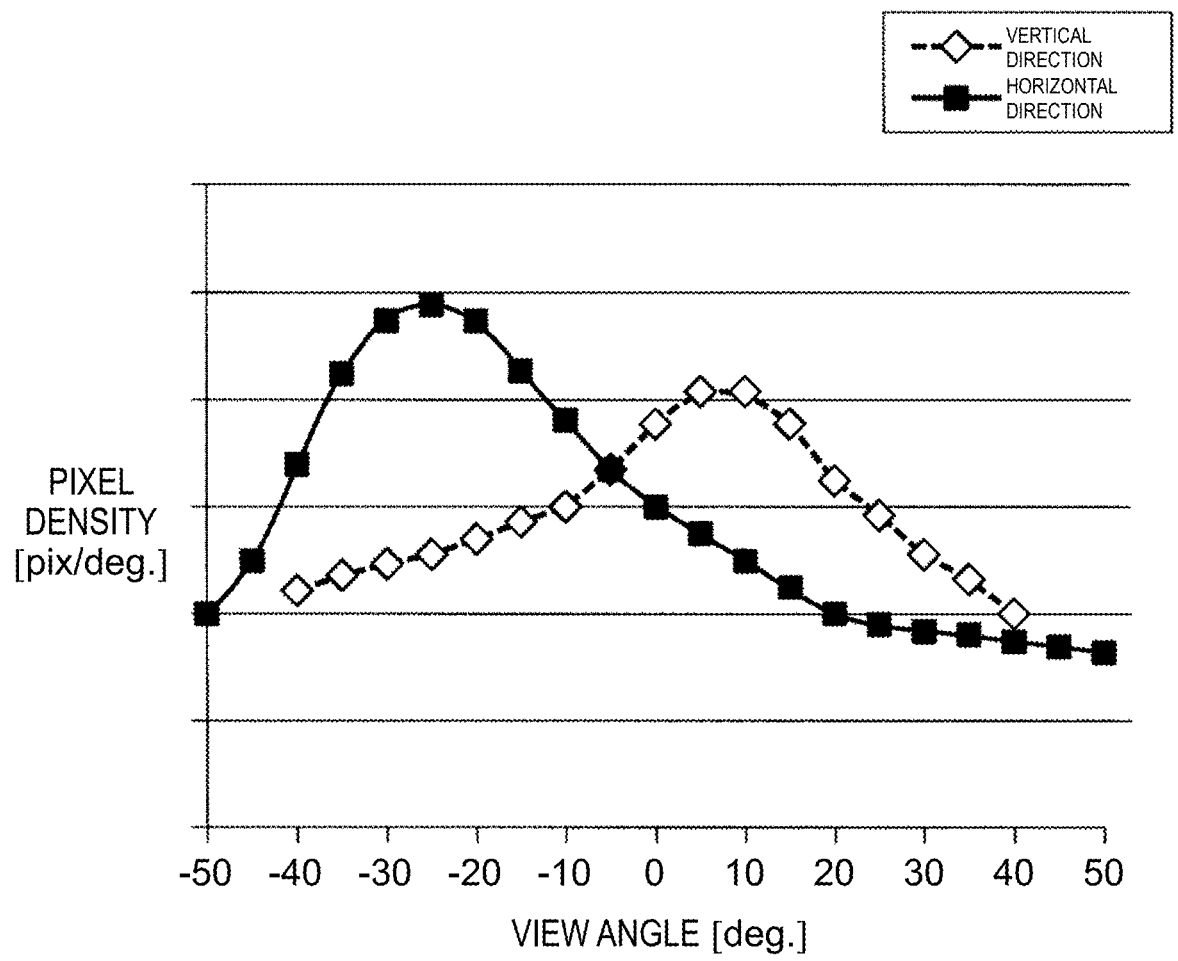
FIG. 19 is a diagram illustrating a pixel density with respect to a view angle of the image sensor in the left side camera according to the second exemplary embodiment.

As shown in FIG. 19, image sensor 12b has such a pixel distribution that a region corresponding to region R1 shifted from the center has a high pixel density and the other region (a region corresponding to region R2) has a low pixel density. As shown in FIG. 19, a pixel density is high in a range of ±11.5° with +8° as a center in the vertical direction. In the horizontal direction, a pixel density is high in a range of ±15° with −25° as a center. By using the combination of optical system 11b and image sensor 12b, it is possible to obtain captured image 300b that has a similar resolution distribution to the first exemplary embodiment.

As described above, side camera 10b of the present exemplary embodiment is an imaging apparatus attached to a side of vehicle 100 (one example of moving body). Side camera 10b includes image sensor 12b and optical system 11b. Image sensor 12b includes an imaging surface on which a plurality of pixels are two-dimensionally arranged. Image sensor 12b generates image data from a subject image formed on the imaging surface. Optical system 11b forms the subject image in a range of a predetermined vertical view angle and a predetermined horizontal view angle on the imaging surface of image sensor 12b. Here, the number of pixels for capturing a subject image included in a unit view angle is defined as resolution. Optical system 11b forms an image on the imaging surface with uniform resolution. Image sensor 12b has such a pixel distribution that the pixel density of a region corresponding to first region R1 on the imaging surface is higher than the pixel density of a region corresponding to second region R2 different from first region R1. First region R1 is disposed at a position to which a position of center G1 of the region is shifted from a center of the horizontal view angle. Further, first region R1 is disposed at a position to which a position of center G1 of first region R1 is shifted from a center of the vertical view angle.

With the configuration described above, the resolution of region R1 at the center portion in a captured image can be made higher than the resolution of region R2 other than region R1, as in the first exemplary embodiment. This makes it possible to capture an image in which an image of the center portion necessary for image analysis has higher resolution while securing a wide view angle as a whole, thus improving analysis precision of the captured image.

OTHER EXEMPLARY EMBODIMENTS

The first and second exemplary embodiments have been described above as examples of the technique disclosed in the present application. However, the technique according to the present disclosure is not limited to the first and second exemplary embodiments, but is applicable to other exemplary embodiments including appropriate modifications, replacements, additions, omissions, and the like. In addition, new exemplary embodiments can be made by combining constituent elements described in the first and second exemplary embodiments. Accordingly, other exemplary embodiments will be described below.

In the exemplary embodiments described above, the electronic room mirror and the in-vehicle display are exemplified as the display device. However, the type of the display device is not limited to these electronic room mirror and in-vehicle display. An idea of the present disclosure can be adapted to display systems that use various types of display devices according to uses (for example, a head-up display).

While signal processing circuit 13 of side camera 10 performs gamma correction, distortion correction, and the like on images in the exemplary embodiments described above, control device 20 may perform these image processing.

While vehicle 100 of an automobile has been described as an example of a moving body in the exemplary embodiments described above, the moving body is not limited to the automobile. The imaging apparatus according to the exemplary embodiments described above may be used for other moving bodies including a railway, a vessel, an airplane, a robot, a robot arm, a drone, an agricultural machine such as a combine, and a construction machine such as a crane.

The view angle, the resolution, and the like described in the exemplary embodiments are only examples and may be appropriately set based on a target (an object or an event) to be subjected to image analysis.

While the free-form lens is used in the optical system in the exemplary embodiments described above, other types of lens whose magnification ratio (resolution) can be freely designed according to a view angle may be used instead of the free-form lens.

The exemplary embodiments have been described above as examples of the technique in the present disclosure. For that purpose, the accompanying drawings and detailed descriptions have been provided.

Accordingly, the constituent elements described in the accompanying drawings and the detailed description may include not only the constituent elements essential for solving the problem but also constituent elements that are not essential for solving the problem in order to illustrate the technique. It should not be therefore determined that the unessential constituent elements in the accompanying drawings and the detailed description are essential only based on the fact that these constituent elements are included in the drawings and the description.

The above exemplary embodiments are provided to exemplify the technique according to the present disclosure, and various changes, replacements, additions, omissions, and the like can be made within the scope of the claims and equivalents thereof.

INDUSTRIAL APPLICABILITY

The imaging apparatus according to the present disclosure can capture an image in which an image of a center portion necessary for image analysis has high resolution while securing a wide view angle as a whole, can improve analysis precision of a captured image, and can be applied to various uses (an imaging system or a display system in a moving body).

The invention claimed is:

1. An imaging system comprising a first imaging apparatus and a second imaging apparatus attached on left and right sides of a moving body, respectively, the first imaging apparatus and the second imaging apparatus each including:
    an image sensor that includes an imaging surface having a plurality of pixels arranged two-dimensionally and that generates image data from a subject image formed on the imaging surface; and
    an optical system that forms the subject image included in a range of a predetermined vertical view angle and a predetermined horizontal view angle on the imaging surface,
    wherein
    a number of pixels for capturing the subject image included in a unit view angle is defined as resolution,
    the imaging surface includes a first region for capturing a first subject image of the subject image and a second region for capturing a second subject image of the subject image different from the first region,
    the optical system forms the subject image on the imaging surface so as to cause resolution of the first region to be higher than resolution of the second region, and
    a position of a center of the first region is a position horizontally shifted from a center of the predetermined horizontal view angle, and
    wherein:
    the position of the center of the first region in the imaging surface of the first imaging apparatus is horizontally shifted from the center of the predetermined horizontal view angle, in a direction opposite to that which the position of the center of the first region in the imaging surface of the second imaging apparatus is horizontally shifted from the center of the predetermined horizontal view angle, and resolution characteristics of the optical systems of the first imaging apparatus and the second imaging apparatus are the same in the vertical direction.

2. The imaging system according to claim 1, wherein a number of peaks of the resolution in each of the predetermined horizontal view angle and the predetermined vertical view angle is one.

3. The imaging system according to claim 1 wherein each optical system includes a free-form lens.

4. The imaging system according to claim 1, wherein the position of the center of the respective first regions is disposed at the position horizontally shifted from the center of the horizontal view angle toward a region for forming an image of a part of the moving body.

5. The imaging system according to claim 1, wherein the first imaging apparatus and the second imaging apparatus capture respective images of the side and an oblique rear side of the moving body.

6. The imaging system according to claim 1, wherein the moving body is one of an automobile, a railway, a vessel, an airplane, a robot, a robot arm, a drone, an agricultural machine, and a construction machine.

7. The imaging system according to claim 1, further comprising:
    a display device that displays an image based on the image data generated by the first imaging apparatus and the second imaging apparatus.

8. The imaging system according to claim 1, further comprising:
    a control device that analyzes image data generated by the imaging apparatus.

9. An imaging system including at least one of a first imaging apparatus attached to a right side of a moving body, and a second imaging apparatus attached to a left side of the moving body, each of the first and second imaging apparatuses comprising:
    an image sensor that includes an imaging surface having a plurality of pixels arranged two-dimensionally and that generates image data from a subject image formed on the imaging surface; and
    an optical system that forms the subject image included in a range of a predetermined vertical view angle and a predetermined horizontal view angle on the imaging surface,
    wherein
    a number of pixels for capturing the subject image included in a unit view angle is defined as resolution,
    the imaging surface includes a first region for capturing a first subject image of the subject image and a second region for capturing a second subject image of the subject image different from the first region,
    the optical system forms the subject image on the imaging surface so as to cause resolution of the first region to be higher than resolution of the second region, and
    a position of a center of the first region is a position horizontally shifted from a center of the predetermined horizontal view angle, and
    in a case of the first imaging apparatus, a position of a center of the first region in the imaging surface of the first imaging apparatus is horizontally shifted from a center of the predetermined horizontal view angle,
    in a case of the second imaging apparatus, a position of a center of the first region in the imaging surface of the second imaging apparatus is horizontally shifted from a center of the predetermined horizontal view angle in a direction opposite to that which the position of a center of the first region in the imaging surface of the first imaging apparatus is horizontally shifted, and wherein the resolution characteristics of the optical system of the first imaging apparatus and the second imaging apparatus are the same in the vertical direction.

* * * * *